(12) United States Patent
Almanza-Workman et al.

(10) Patent No.: US 12,650,552 B1
(45) Date of Patent: Jun. 9, 2026

(54) VOLUME HOLOGRAM WAVEGUIDE WITH COUPLED PHOTOPOLYMERS

(71) Applicant: Amazon Technologies, Inc., Seattle, WA (US)

(72) Inventors: Angeles Marcia Almanza-Workman, Sunnyvale, CA (US); Pierre-Alexandre Blanche, Tucson, AZ (US); Arkady Bablumyan, Escondido, CA (US); Chen Liang, Tucson, AZ (US); Nelson Nasser Peygambarian, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 18/241,599

(22) Filed: Sep. 1, 2023

Related U.S. Application Data

(60) Provisional application No. 63/404,454, filed on Sep. 7, 2022.

(51) Int. Cl.
*F21V 8/00* (2006.01)
*G02B 5/32* (2006.01)
*G02B 27/01* (2006.01)

(52) U.S. Cl.
CPC ............. *G02B 6/0076* (2013.01); *G02B 5/32* (2013.01); *G02B 6/0026* (2013.01); *G02B 6/005* (2013.01); *G02B 6/0093* (2013.01); *G02B 27/0172* (2013.01)

(58) Field of Classification Search
CPC .... G02B 6/0076; G02B 6/0026; G02B 6/005; G02B 6/0093; G02B 5/32
See application file for complete search history.

(56) References Cited

U.S. PATENT DOCUMENTS

| | | | |
|---|---|---|---|
| 11,108,977 B1 * | 8/2021 | Sharma .............. | G02B 27/0172 |
| 11,630,325 B1 * | 4/2023 | Almanza-Workman ..................... G02B 1/11 351/158 |
| 2015/0192725 A1 * | 7/2015 | Facke .................... | G02B 6/005 362/606 |
| 2018/0373046 A1 | 12/2018 | Alexander et al. | |
| 2019/0056593 A1 | 2/2019 | Bablumyan | |
| 2019/0271845 A1 * | 9/2019 | Cormier ............. | G02B 27/0172 |

(Continued)

OTHER PUBLICATIONS

Almanza-Workman et al., U.S. Appl. No. 18/241,596, "Optical Waveguide With Multiple Layers in a Stack Arrangement," filed Sep. 1, 2023.

(Continued)

*Primary Examiner* — Tina Wong
(74) *Attorney, Agent, or Firm* — Kilpatrick Townsend & Stockton LLP

(57) ABSTRACT

Techniques for optical waveguides with multiple layers in a stack arrangement are described herein. In an example, an optical waveguide system includes a waveguide substrate, a first holographic optical element, a second holographic optical element, and an optical de-coupling layer. The first holographic optical element includes a first photopolymer layer and excluding a first polymer substrate and the second holographic optical element includes a second photopolymer layer. The first photopolymer layer is attached to the waveguide substrate and to either the second holographic optical element or the optical de-coupling layer.

20 Claims, 14 Drawing Sheets

(56)　　　　　References Cited

U.S. PATENT DOCUMENTS

2020/0225498　A1　　7/2020　Potnis et al.
2021/0026140　A1 *　1/2021　Kasegawa ............ G02B 6/0023

OTHER PUBLICATIONS

Almanza-Workman et al., U.S. Appl. No. 18/214,896, "Optical Waveguide With Multiple Layers in a Stack Arrangement," filed Sep. 1, 2023.

* cited by examiner

AR Device
101

110

106
102
108
104

103
104
105

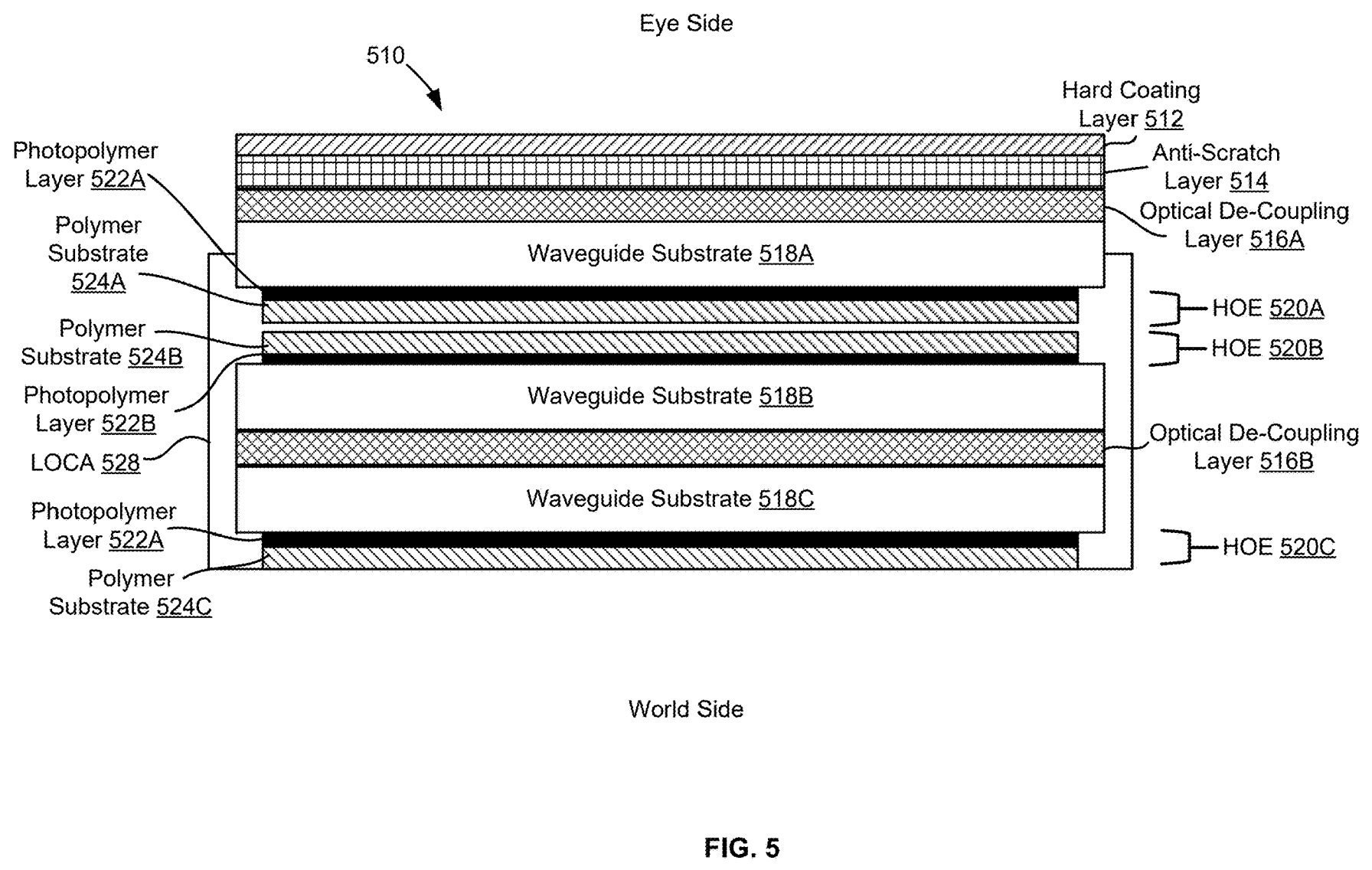

Eye Side

Hard Coating Layer 512
Anti-Scratch Layer 514
Optical De-Coupling Layer 516A
HOE 520A
HOE 520B
Optical De-Coupling Layer 516B
HOE 520C

510

Waveguide Substrate 518A
Waveguide Substrate 518B
Waveguide Substrate 518C

Photopolymer Layer 522A
Polymer Substrate 524A
Polymer Substrate 524B
Photopolymer Layer 522B
LOCA 528
Photopolymer Layer 522A
Polymer Substrate 524C World Side

FIG. 5

Figure 7:
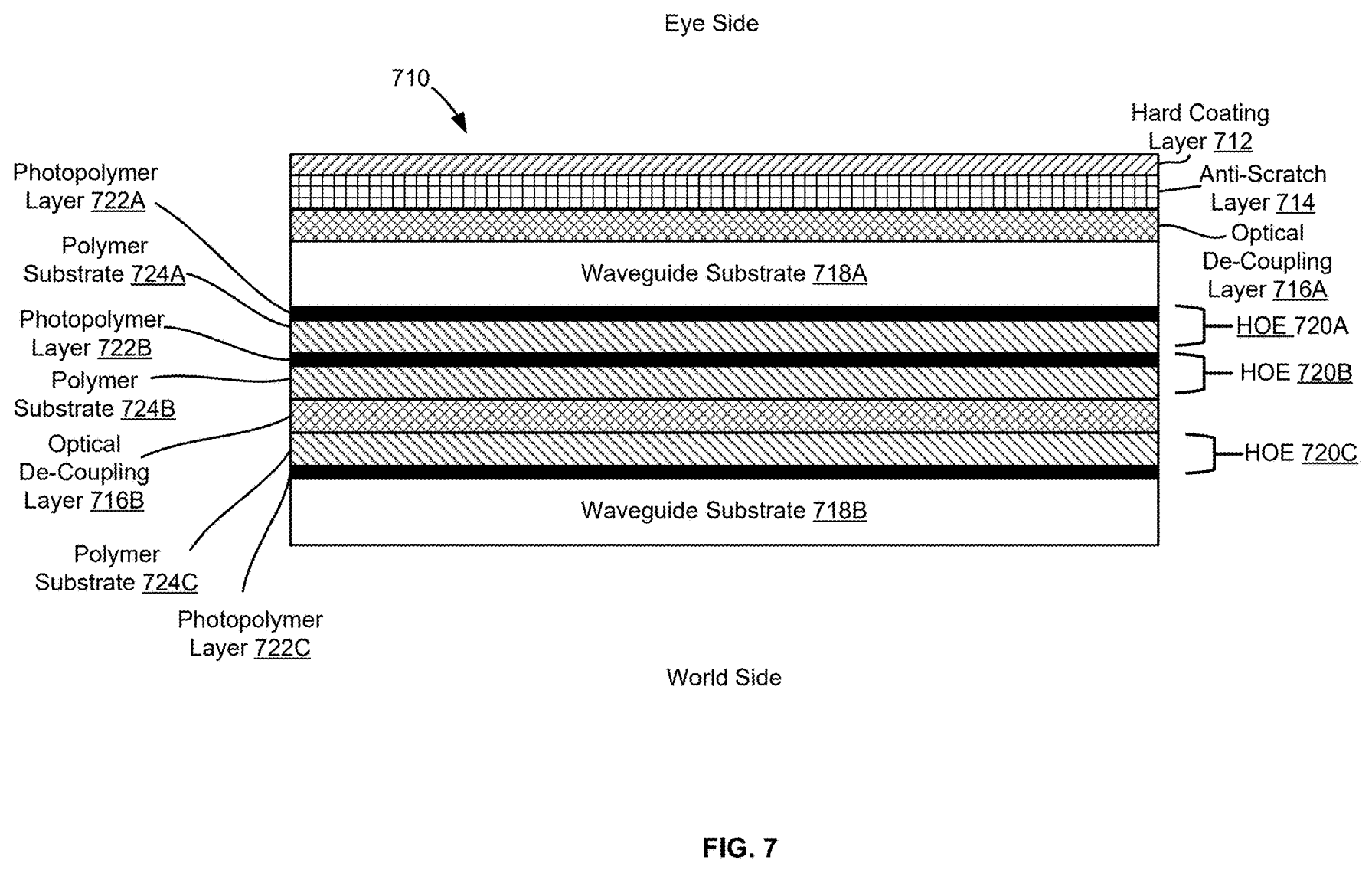

Eye Side

Hard Coating Layer 712
Anti-Scratch Layer 714
Optical De-Coupling Layer 716A
HOE 720A
HOE 720B
HOE 720C Waveguide Substrate 718A Waveguide Substrate 718B World Side

710

Photopolymer Layer 722A
Polymer Substrate 724A
Photopolymer Layer 722B
Polymer Substrate 724B
Optical De-Coupling Layer 716B
Polymer Substrate 724C
Photopolymer Layer 722C

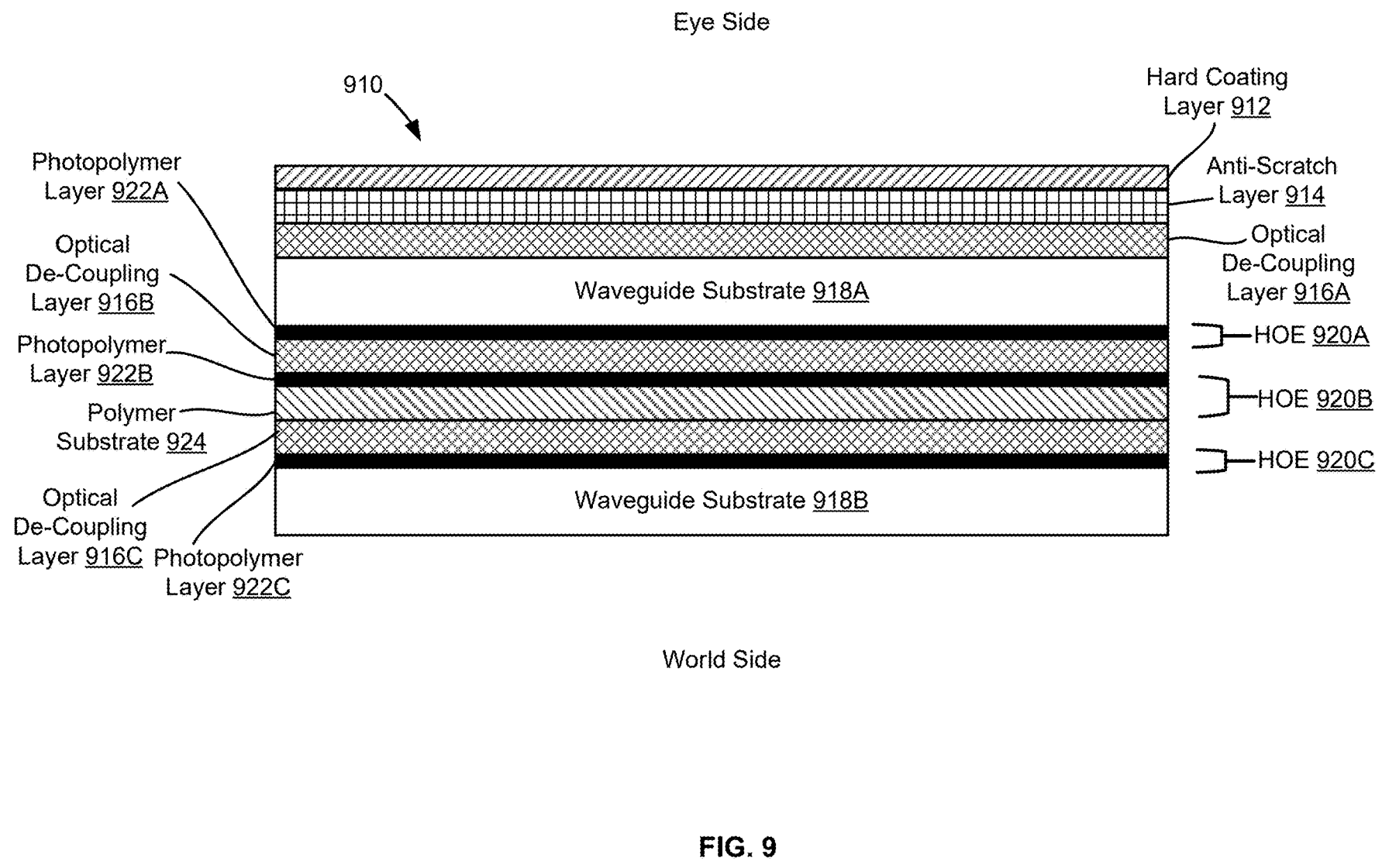

Eye Side

Hard Coating Layer 912

Anti-Scratch Layer 914

Optical De-Coupling Layer 916A

HOE 920A

HOE 920B

HOE 920C

910

Waveguide Substrate 918A

Waveguide Substrate 918B

Photopolymer Layer 922A

Optical De-Coupling Layer 916B

Photopolymer Layer 922B

Polymer Substrate 924

Optical De-Coupling Layer 916C

Photopolymer Layer 922C

World Side

FIG. 9

VOLUME HOLOGRAM WAVEGUIDE WITH COUPLED PHOTOPOLYMERS

CROSS-REFERENCE TO RELATED APPLICATIONS

This application claims the benefit of and priority to U.S. Provisional Application No. 63/404,454, filed Sep. 7, 2022, and entitled "LIGHTER AND THINNER VHOE FLAT WAVEGUIDE STACK UP OPTIONS," the contents of which are hereby incorporated by reference in their entireties for all purposes. Further, this application is related to and incorporates by reference for all purposes the full disclosure of co-pending U.S. patent application Ser. No. 18/241,596, filed Sep. 1, 2023, and entitled "OPTICAL WAVEGUIDE WITH MULTIPLE LAYERS IN A STACK ARRANGEMENT".

BACKGROUND

Image displays have been utilized in different mixed reality systems such as augmented reality systems that include near eye displays and heads-up displays. In a mixed reality system, an image can be displayed to a user from a light projector onto a light transparent combiner that allows the user to also view the real world.

BRIEF DESCRIPTION OF THE DRAWINGS

Various embodiments in accordance with the present disclosure will be described with reference to the drawings, in which:

FIG. 5 illustrates another example of an optical waveguide combiner system in accordance with an embodiment of the disclosure;

FIG. 7 illustrates another example of an optical waveguide combiner system in accordance with an embodiment of the disclosure;

FIG. 8 illustrates another example of an optical waveguide combiner system in accordance with an embodiment of the disclosure;

FIG. 9 illustrates another example of an optical waveguide combiner system in accordance with an embodiment of the disclosure;

DETAILED DESCRIPTION

Figure 1:
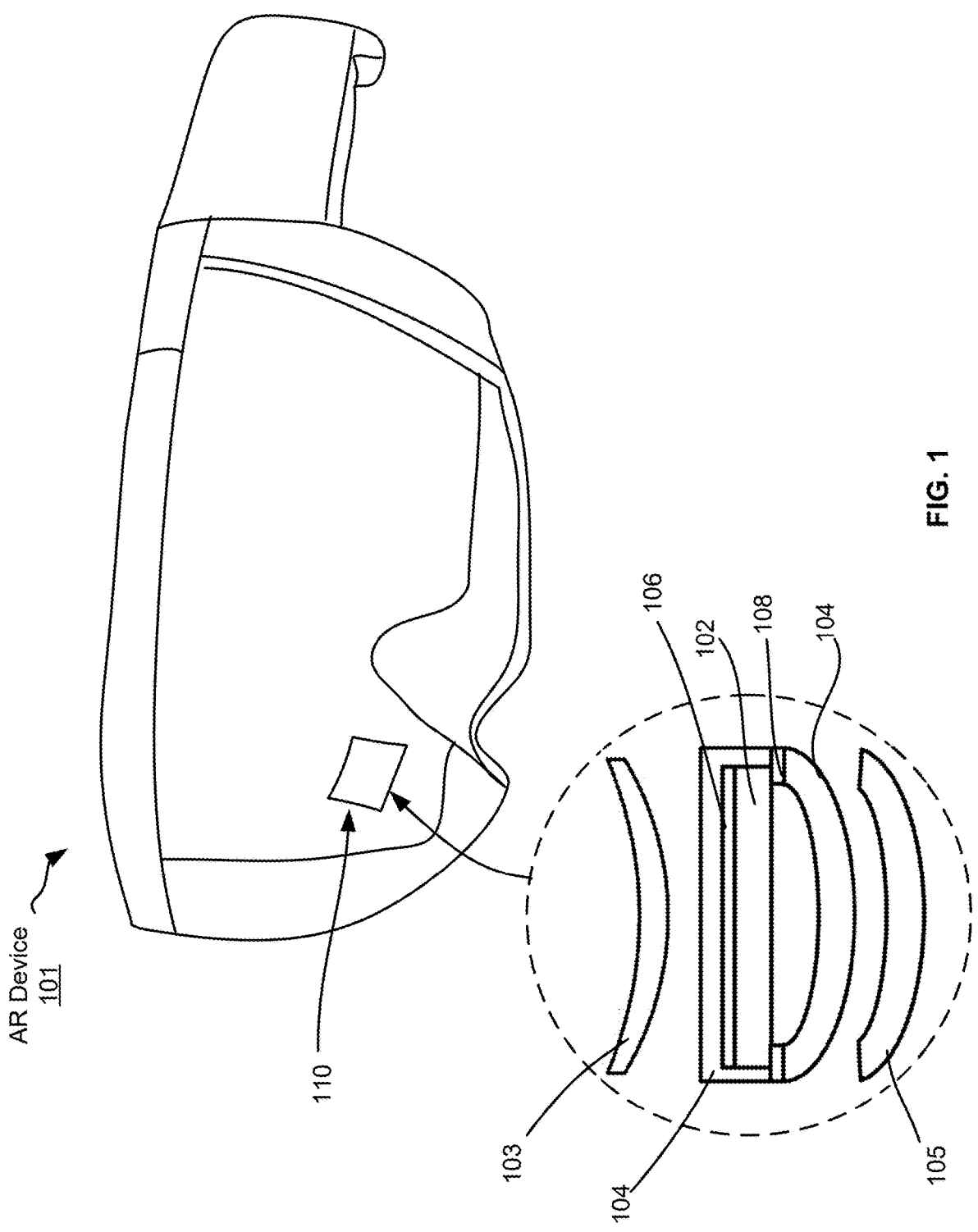
FIG. 1 illustrates an example of a mixed reality device that implements an optical waveguide with multiple holographic layers in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an optical waveguide with multiple layers in a stack arrangement. An optical waveguide combiner system can receive light emitted by a light source, where the light represents virtual imagery. The optical waveguide combiner system can combine the light with real-world light representing real-world imagery such that a combination of the virtual imagery and real-world imagery can be presented to a user. To do so, the optical waveguide combiner can include at least a set of waveguide substrates and a set of holographic optical elements. A waveguide substrate can propagate light along a propagation path within the waveguide substrate according to total internal reflection (TIR). A holographic optical element can be an injection holographic element, a redirection holographic element, and/or an extraction holographic element that can couple light into or out of a waveguide substrate. Each of the holographic optical elements can include a polymer substrate and a polymer layer. In an example, multiple holographic optical elements can be attached to each other. For instance, a first photopolymer layer of a first holographic optical element can be attached to a surface of a first polymer substrate of the first holographic optical element and to a surface of a waveguide substrate. In addition, a second photopolymer layer of a second holographic optical element can be attached to the first polymer substrate of the first holographic optical element and to a second polymer substrate of the second holographic optical layer. By attaching multiple holographic optical elements, the number of waveguide substrates can be reduced, thereby rendering the optical waveguide combiner system thinner and/or lighter.

Generally, to reduce the weight and/or thickness of an optical waveguide combiner system, different approaches and a combination of two or more of such approaches are possible as further described herein below. In one example, multiple holographic optical elements can be attached to each other, as described herein above and further described herein below. In another example, rather than using a glass waveguide substrate, a plastic waveguide substrate is possible. The plastic waveguide substrate can reduce the overall weight. Given its shattering and impact resistance properties, the plastic waveguide substrate can also reduce the thickness and size of the encapsulation housing. In yet another example, a holographic optical element can include a photopolymer film and exclude a polymer substrate. Instead, the photopolymer film is transferred to and attached directly to a waveguide substrate. In this case, by avoiding the use of the polymer substrate, the overall thickness and weight can be reduced. In a further example, a photopolymer film can be configured, via a recording process, to multiplex first light having a first length within a first wavelength range (e.g., red light) and second light having a second length within a second, different wavelength range (e.g., blue light). In this way, rather than using two holographic optical elements for the two lights, a single holographic optical can be used and can multiplex the two lights. In this example, by using one optical holographic element instead of two, the overall thickness and weight can be reduced.

To illustrate the approach of multiple holographic elements attached to each other, consider an example of an augmented reality device that implements an optical system of the present disclosure. The augmented reality device can be wearable glasses that include a light projector and a waveguide system. The waveguide system includes two waveguide substrates, one that is towards a user-facing side of the augmented reality device and one that is towards a world-facing side of the augmented reality device. Holographic optical elements are disposed between each of the waveguide substrates. Each holographic optical element includes a photopolymer layer and a polymer substrate. As an example, the waveguide substrate of the user-facing side can be coupled to a red-light photopolymer that operates with light in the red wavelength range. The red-light photopolymer is coupled to a polymer substrate, which is also coupled to a blue-light photopolymer that operates with light in the blue wavelength range. The blue-light photopolymer is also coupled to a polymer substrate that is coupled to an optical de-coupling layer characterized by a refractive index of less than or equal to 1.25. The optical de-coupling layer is further coupled to a polymer substrate that is coupled to a green-light photopolymer that operates with light in the green wavelength range. The green-light photopolymer is coupled to the world-side facing waveguide substrate.

Embodiments of the present disclosure provide several technical advantages over conventional optical waveguide combiner systems. For instance, conventional waveguide systems may have certain weight and thickness. Embodiments of the present disclosure allow the reduction of the weight and/or thickness by using any of the above described example approaches or by using a combination thereof. For instance, a waveguide substrate with a lower density than glass may be used with high impact resistance to prevent shattering upon impact (e.g., a plastic waveguide substrate). As a result, an encapsulation used around a waveguide may be simplified or eliminated. In addition, polymer substrate of holographic recording media with a controlled thickness and a low surface roughness can be used to eliminate the need of a secondary waveguide substrate to control parallelism in total internal reflection. Moreover, transfer grade photopolymer materials can be used so that the photopolymer can be transferred or coated directly on a waveguide substrate. Additionally, a high index of refraction modulation in the hologram recording media can be used to allow multiplexing in a holographic optical element, further reducing a number of layers and substrates needed.

As used herein, the terms "light" and "optical" are used in their customary ordinary meaning and refer to electromagnetic wave having a wavelength within the visible region of the optical spectrum and, optionally, within a region that neighbors the visible region (a flanking region). Also as used herein, the term "hologram" is used in its customary ordinary meaning and refers to a diffraction pattern-produced or recorded by a spatially split coherent beam of radiation (such as a laser beam) in a layer of an optical material. The term "holographic element" refers to a layer of material containing a hologram recorded therein (in a body or thickness of the layer) and/or as a surface modulation (surface relief) of such a layer.

FIG. 1 illustrates an example of a mixed reality device that implements homogenous light intensity output in accordance with an embodiment of the disclosure. In the example of FIG. 1, the mixed reality device is illustrated as an augmented reality (AR) device 101. However, other types of mixed reality devices are likewise possible, such as heads up displays (HUDs), holographic devices, and the like. Generally, a mixed reality device enables combining images from different sources via an optical waveguide combiner. One source can be the real world, whereby these images are real-world images. Another source can be a virtual world, whereby these images are virtual (or digital) images. A waveguide combiner projects virtual images and allow a viewer to see through the real world for AR and heads-up display (HUD) applications. The waveguide combiner offers the possibility to extend the eye box without sacrificing the field of view. The eye box is the region where the viewer sees the image, and the field of view is the angular extent (size) of the image.

Referring to FIG. 1, the AR device 101 (e.g., its optical waveguide combiner system) can combine the real-world images with the virtual images. The real-world images can be perceived through a see-through lens of the AR device 101. The virtual images can be formed based on light emission from a light projector.

The AR device 101 may include an optical waveguide combiner system 110. The optical waveguide combiner system 110 (or at least its optical waveguide combiner) can span the entirety of a face shield of the AR device 101 or a portion thereof. In an example, the optical waveguide combiner system 110 includes a waveguide 102, an encapsulation housing 104, a low refractive index layer 106, and an optical adhesive 108. The waveguide 102 is decoupled from the encapsulation housing 104 by the low refractive index layer 106, which may be an adhesive, a coating, or a thin air gap. The encapsulation housing 104 can be a zero-power lens with an anti-reflective coating that enhances a mechanical integrity of the optical waveguide combiner system 110. The entire or portions of the encapsulation housing 104 can be made of a lightweight shatter resistant material, such as plastic and/or can include shatter reducing material. For example, rubber, gel, foam, or other shatter reducing materials can be included in the sidewalls of the encapsulation housing 104 at the location of the sidewalls where the waveguide 102 is disposed. Optionally, the optical waveguide combiner system 110 may also include a sunglass clip-on 103 and a prescription lens insert 105. The sunglass clip-on 103 is on a world side of the optical waveguide combiner system 110, whereas the prescription lens insert 105 is on an eye side of the optical waveguide combiner system 110.

This optical waveguide combiner system 110 may be lighter and/or thinner than conventional optical waveguide combiner systems. To achieve this, the waveguide 102 may include one or more waveguide substrate(s) that are shatter resistant and that have a density smaller than glass (e.g., plastic waveguide substrate(s)). In addition, holographic optical elements may be directly coupled (e.g., attached to each other or integrated with each other) using a multiplexing photopolymer or using transfer grade polymers, or by stacking them so that a photopolymer of one holographic optical element is in contact with a polymer substrate of another holographic optical element. By doing so, the waveguide 102 itself becomes thinner and/or lighter and allows the encapsulation housing 104 to be thinner and/or lighter.

Figure 2:
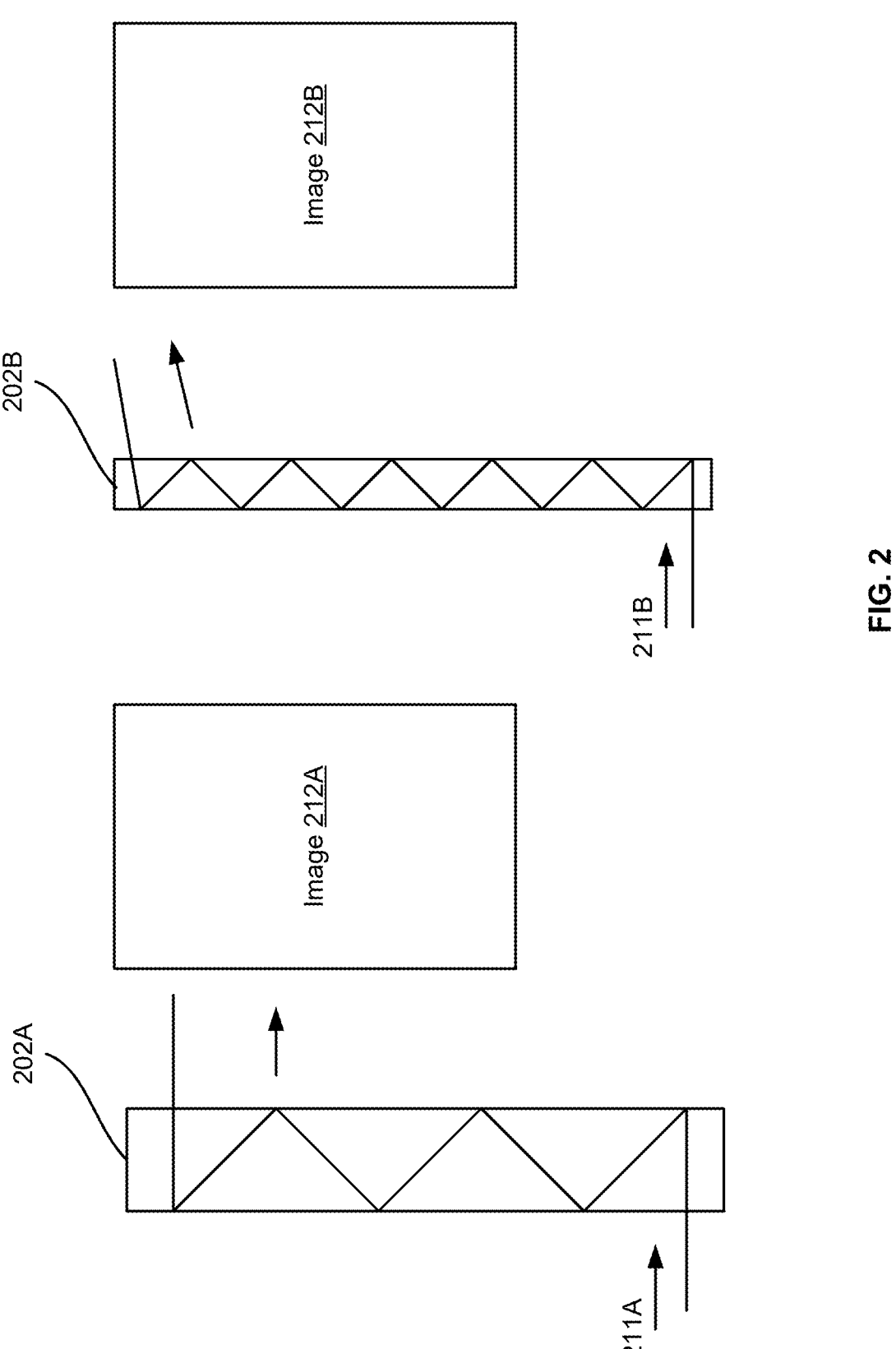
FIG. 2 illustrates examples of images produced from waveguides of various thicknesses in accordance with an embodiment of the disclosure.

FIG. 2 illustrates examples of images 212A-212B produced from waveguides 202A-202B of various thicknesses in accordance with an embodiment of the disclosure. As illustrated, the waveguide 202A may be thicker than the waveguide 202B. Input light 211A representing an input image is injected into the waveguide 202A (e.g., via an injection holographic optical element), propagates through the waveguide 202A by total internal reflection, and is extracted (e.g., via an extraction holographic optical element) to generate an image 212A. Similarly, input light 211B representing the same input image is injected into the waveguide 202B (e.g., via an injection holographic optical element), propagates through the waveguide 202B by total internal reflection, and is extracted (e.g., via an extraction holographic optical element) and to generate an image 212B. Because the waveguide 202B is thinner than the waveguide 202A, the total internal reflection in the waveguide 202B results in more bounces for the input light 211A before being extracted than the input light's 211A propagation within and extraction from the waveguide 202A. As such, any non-uniformity in the waveguide 202B (e.g., at its output surface in terms of surface roughness, total thickness variation, and/or warping, for example) has a higher impact than non-uniformity in the waveguide 202A. The non-uniformity can contribute to angular errors in the propagation of the input lights 211A-211B. Accordingly, because of the increased number of bounces and the increased angular errors, the image quality of the image 212B extracted from the waveguide 202B may be worse (e.g., blurrier and/or more distorted) than the image quality of the image 212A extracted from the waveguide 202A.

Figure 3:
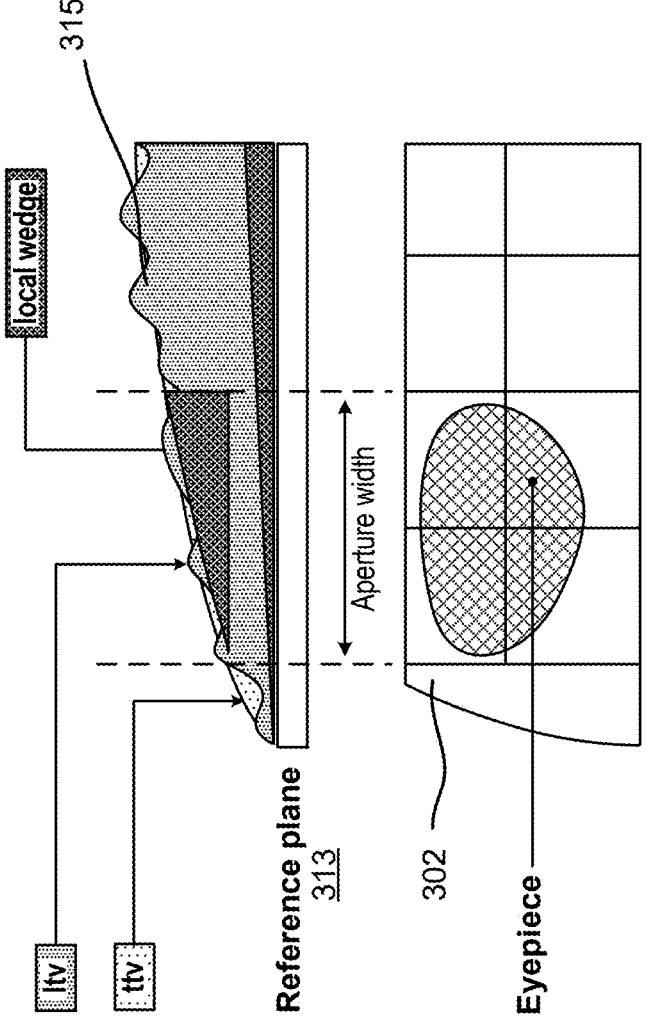
FIG. 3 illustrates an example of waveguide surface roughness in accordance with an embodiment of the disclosure.

FIG. 3 illustrates an example of waveguide surface roughness in accordance with an embodiment of the disclosure. A waveguide 302 is illustrated as having a reference plane 313, which is a horizontal, flat plane. Ideally, a surface of the waveguide 302 would align with the reference plane 313 and be flat in the horizontal plane. In actuality, the waveguide 302 has some surface roughness 315 where the surface of the waveguide 302 is not flat. As light propagates within the waveguide 302, the surface roughness 315 can contribute to angular errors in the light propagation, which results in reduced image quality, as described in FIG. 2. In addition, for thinner waveguides, since the light experiences a higher number of bounces, the surface roughness 315 has a bigger impact on the output image quality than for thicker waveguides.

Although not illustrated in FIG. 3, other physical properties of the thinner waveguide may contribute to the worsening of the image quality. For example, the thinner waveguide can be subject to more warping or bending than a thicker waveguide. A change to the curvature (e.g., from warping or bending) can impact the total internal reflection propagation (e.g., the angles of reflection and the angles of arrival of light beams at extraction sites), resulting in relatively poorer image quality.

Figure 4:
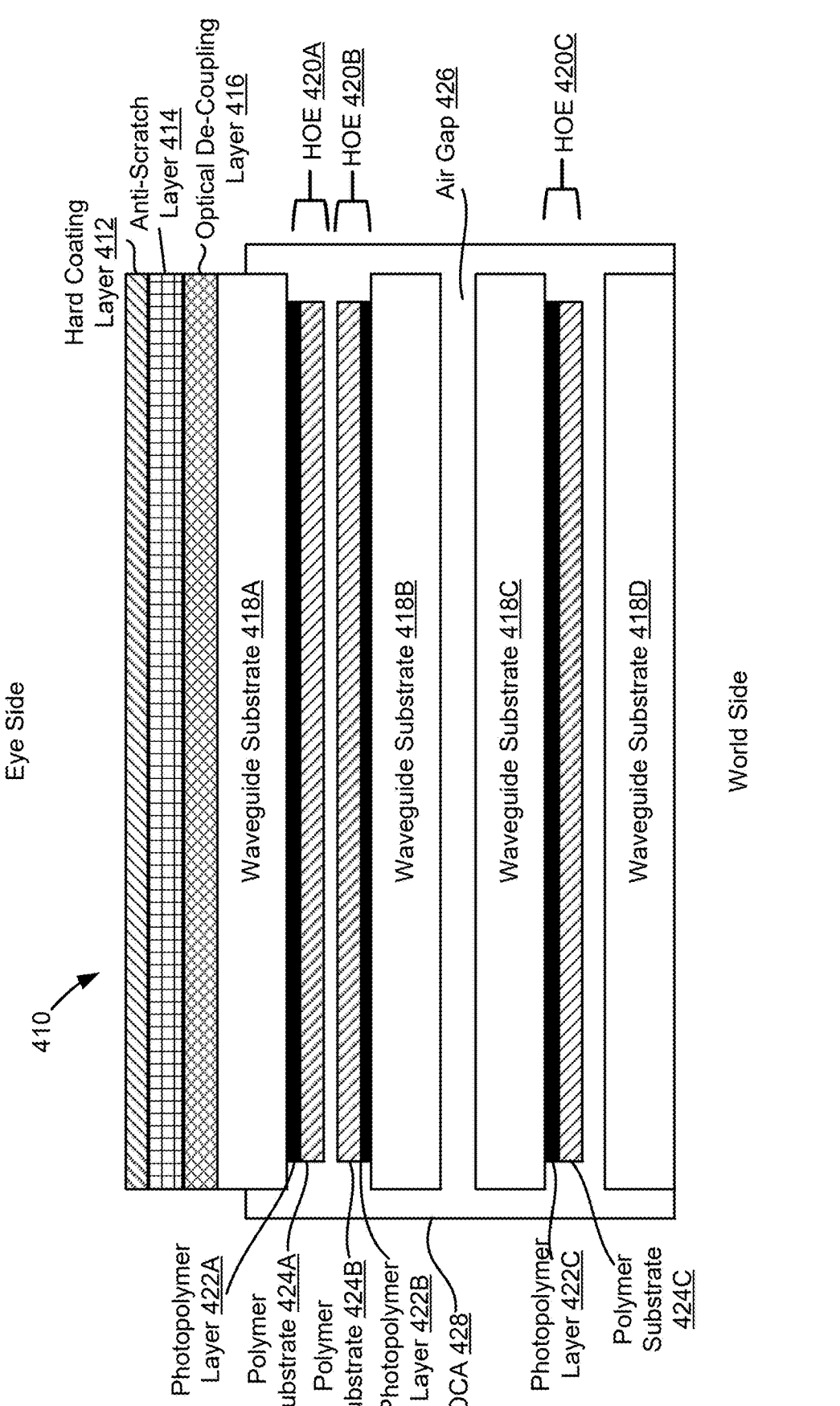
FIG. 4 illustrates an example of an optical waveguide combiner system in accordance with an embodiment of the disclosure.

FIG. 4 illustrates an example of an optical waveguide combiner system 410 in accordance with an embodiment of the disclosure. The optical waveguide combiner system 410 is an example of the optical waveguide combiner system 110 in FIG. 1. Going from a user-facing side (e.g., eye side) of the optical waveguide combiner system 410 towards a world-facing side of the optical waveguide combiner system 410, the optical waveguide combiner system 410 includes a hard coating layer 412, an anti-scratch layer 414, an optical de-coupling layer 416, a waveguide substrate 418A, a holographic optical element 420A, a holographic optical element 420B, a waveguide substrate 418B, an air gap 426, a waveguide substrate 418C, a holographic optical element 420C, and a waveguide substrate 418D. In addition, the optical waveguide combiner system 410 can include a liquid optically clear adhesive (LOCA) 428 that is used to couple different layers to each other.

In an example, each of the waveguide substrates 418A-418D may be a glass waveguide substrate or a plastic waveguide substrate (or any other waveguide substrate lighter than glass and having better shattering properties than glass). Glass waveguide substrates may have a thickness between 0.1 mm and 0.5 mm. As an example, a glass waveguide substrate may have a thickness of 0.2 mm or 0.3 mm. Plastic waveguide substrates may have a thickness between 0.25 mm and 1 mm. As an example, a plastic waveguide substrate may have a thickness of 0.3 mm or 0.5 mm and can be made of polyethylene, acrylic, or cyclo olefin polymer. The waveguide substrates 418A-418D can provide light propagation by total internal reflection.

The hard coating layer 412 can provide protection against scratching and reflections while being optically transparent. In an example, the hard coating layer 412 may be an optically transparent silicon oxide layer. The anti-scratch layer 414 provides protection against impact resistance. If the waveguide substrate 418A is a glass waveguide substrate, the anti-scratch layer 414 can be made from polycarbonate and have a thickness between 0.25 mm and 0.75 mm. For example, the polycarbonate may be similar to one made by, e.g., Inkron Oy, Finland, and have a thickness of about 0.5 mm. Alternatively, if the waveguide substrate 418A is a plastic waveguide substrate, the anti-scratch layer 414 can be made from triacetate cellulose and have a thickness between sixty micrometers and one-hundred twenty micrometers. For example, the triacetate cellulose may have a thickness of eighty micrometers.

In an example, the optical de-coupling layer 416 can optically de-couple the waveguide substrate 418A from the anti-scratch layer 414 (e.g., light propagating within the waveguide substrate 418 is de-coupled from the anti-scratch layer 414). The optical de-coupling layer 416 can be characterized by a refractive index of less than or equal to 1.25 and can be attached to or disposed between the anti-scratch layer 414 and an upper surface of the waveguide substrate 418A. The optical de-coupling layer 416 may be a double-sided optically clear adhesive (OCA) tape made by Nitto Denko Corporation, Japan. For example, the optical de-coupling layer 416 may be fifty micrometer CS986 tape made by Nitto Denko Corporation, Japan. In some cases, the optical de-coupling layer 416 may be an air gap.

Each of the holographic optical elements 420A-420C may be an injection holographic element for injecting light into the optical waveguide combiner system 410, a redirection holographic element for redirecting light within the optical waveguide combiner system 410, or an extraction holographic element for extracting light from the optical waveguide combiner system 410. In addition, each of the holographic optical elements 420A-420C can include a photopolymer layer 422A-422C and a polymer substrate 424A-424C. That is, holographic optical element 420A includes photopolymer layer 422A and polymer substrate 424A, holographic optical element 420B includes photopolymer layer 422B and polymer substrate 424B, and holographic optical element 420C includes photopolymer layer 422C and polymer substrate 424C. In an example, a photopolymer layer can comprise BAYFOL HX© sold by Covestro AG, having a sensitivity of ten mJ per cm$^2$ and is easy to post process by simple ultraviolet light (e.g., sun or lamp) exposure. Dichromated gelatin (DCG) is another material that can be used for a photopolymer film and that can achieve a high index modulation and is robust to the environment once encapsulated.

The photopolymer layers 422A-422C may each be associated with light of different wavelength ranges, and thus light of different light colors. For instance, the photopolymer layer 422A may be a red photopolymer layer associated with wavelengths between six-hundred twenty nm and seven-hundred fifty nm, the photopolymer layer 422B may be a blue photopolymer layer associated with wavelengths between four-hundred fifty nm and four-hundred ninety-five nm, and the photopolymer layer 422C may be a green photopolymer layer associated with wavelengths between five-hundred nm and five-hundred seventy nm. Each of the photopolymer layers 422A-422C may have a thickness between two mm and 4.5 mm. For instance, the photopolymer layers 422A-422C may have a thickness of three mm.

In an example, each of the polymer substrates 424A-424C can hold a corresponding photopolymer layer 422 in place. The polymer substrates 424A-424C may be triacetate cellulose, polyethylene terephthalate, polycarbonate, a polyamide, a cyclic olefin polymer, or a cyclic olefin copolymer. Each of the polymer substrates 424A-424C may be between fifty micrometers and one-hundred fifty micrometers. As an example, the polymer substrates 424A-424C are one-hundred micrometers thick.

As illustrated in FIG. 4, a bottom surface of the waveguide substrate 418A is coupled to the holographic optical element 420A. The photopolymer layer 422A of the holographic optical element 420A is coupled to the bottom surface of the waveguide substrate 418A and to an upper surface of the polymer substrate 424A. In addition, a top surface of the waveguide substrate 418B is coupled to the holographic optical element 420B. The photopolymer layer 422B of the holographic optical element 420B is coupled to a top surface of the waveguide substrate 418B and to a bottom surface of the polymer substrate 424B.

The air gap 426 may include spacers and anti-reflection coatings between the waveguide substrates 418B-418C. The anti-reflective coatings may be a similar material as the hard coating layer 412, such as a metallic oxide. The spacers may have a thickness between 0.025 and 0.075 mm. For instance, the spacers may have a thickness of 0.05 mm in one example.

In an example, a top surface of the waveguide substrate 418C is coupled to the spacers and the air gap 426 and a bottom surface of the waveguide substrate 418C is coupled to the holographic optical element 420C. The photopolymer layer 422C of the holographic optical element 420C is coupled to the bottom surface of the waveguide substrate 418C and to an upper surface of the polymer substrate 424C. In addition, a bottom surface of the waveguide substrate 418D faces the world-facing side of the optical waveguide combiner system 410.

FIG. 5 illustrates another example of an optical waveguide combiner system 510 in accordance with an embodiment of the disclosure. The optical waveguide combiner system 510 is an example of the optical waveguide combiner system 110 in FIG. 1. Here, and unlike the embodiment shown in FIG. 5, at least one waveguide substrate (e.g., the one nearest to a user-facing side) can be lighter and more shatter resistant than a glass waveguide substrate.

Going from a user-facing side (e.g., eye side) of the optical waveguide combiner system 510 towards a world-facing side of the optical waveguide combiner system 510, the optical waveguide combiner system 510 includes a hard coating layer 512, an anti-scratch layer 514, an optical de-coupling layer 516A, a waveguide substrate 518A, a holographic optical element 520A, a holographic optical element 520B, a waveguide substrate 518B, an optical de-coupling layer 516B, a waveguide substrate 518C, and a holographic optical element 520C. In addition, the optical waveguide combiner system 510 can include a LOCA 528 that is used to couple each of the layers together.

The hard coating layer 512, the anti-scratch layer 514, and the optical de-coupling layers 516A-516B are examples of the hard coating layer 412 in FIG. 4, the anti-scratch layer 414 in FIG. 4, and the optical de-coupling layer 416 in FIG. 4, respectively. In addition, the holographic optical elements 520A-520C are examples of the holographic optical elements 420A-420C in FIG. 4, respectively, the waveguide substrates 518A-518C are examples of the waveguide substrates 418A-418D in FIG. 4, and the LOCA 528 is an example of the LOCA 428 in FIG. 4.

As illustrated in FIG. 5, a top surface of the waveguide substrate 518A is coupled to a bottom surface of the optical de-coupling layer 516A and a bottom surface of the waveguide substrate 518A is coupled to the holographic optical element 520A. A photopolymer layer 522A of the holographic optical element 520A is coupled to the bottom surface of the waveguide substrate 518A and to an upper surface of a polymer substrate 524A. The photopolymer layer 522A may be a red photopolymer layer. In addition, a top surface of the waveguide substrate 518B is coupled to the holographic optical element 520B. A photopolymer layer 522B of the holographic optical element 520B is coupled to a top surface of the waveguide substrate 518B and to a bottom surface of the polymer substrate 524B. The photopolymer layer 522B may be a blue photopolymer layer.

The bottom surface of the waveguide substrate 518B is coupled to a top surface of the optical de-coupling layer 516B, and a bottom surface of the optical de-coupling layer 516B is coupled to a top surface of the waveguide substrate 518C. A bottom surface of the waveguide substrate 518C is coupled to the holographic optical element 520C. A photopolymer layer 522C of the holographic optical element 520C is coupled to the bottom surface of the waveguide substrate 518C and to an upper surface of a polymer substrate 524C. The photopolymer layer 522C may be a green photopolymer layer. In another example, the bottom surface of the photopolymer layer 522C may be coupled to the top surface of the waveguide substrate 518C.

In an example, the waveguide substrate 518A may be a plastic waveguide substrate, whereas the waveguide substrates 518B-518C may be glass waveguide substrates. In such an example, if either of the waveguide substrates 518A-518C were to shatter, the glass may be contained within the plastic waveguide substrate, reducing a likelihood that glass enters an eye of a user. Ultraviolet absorption in the waveguide substrates 518B-518C may be compensated by using the LOCA 528 through glass waveguide substrates.

Figure 6:
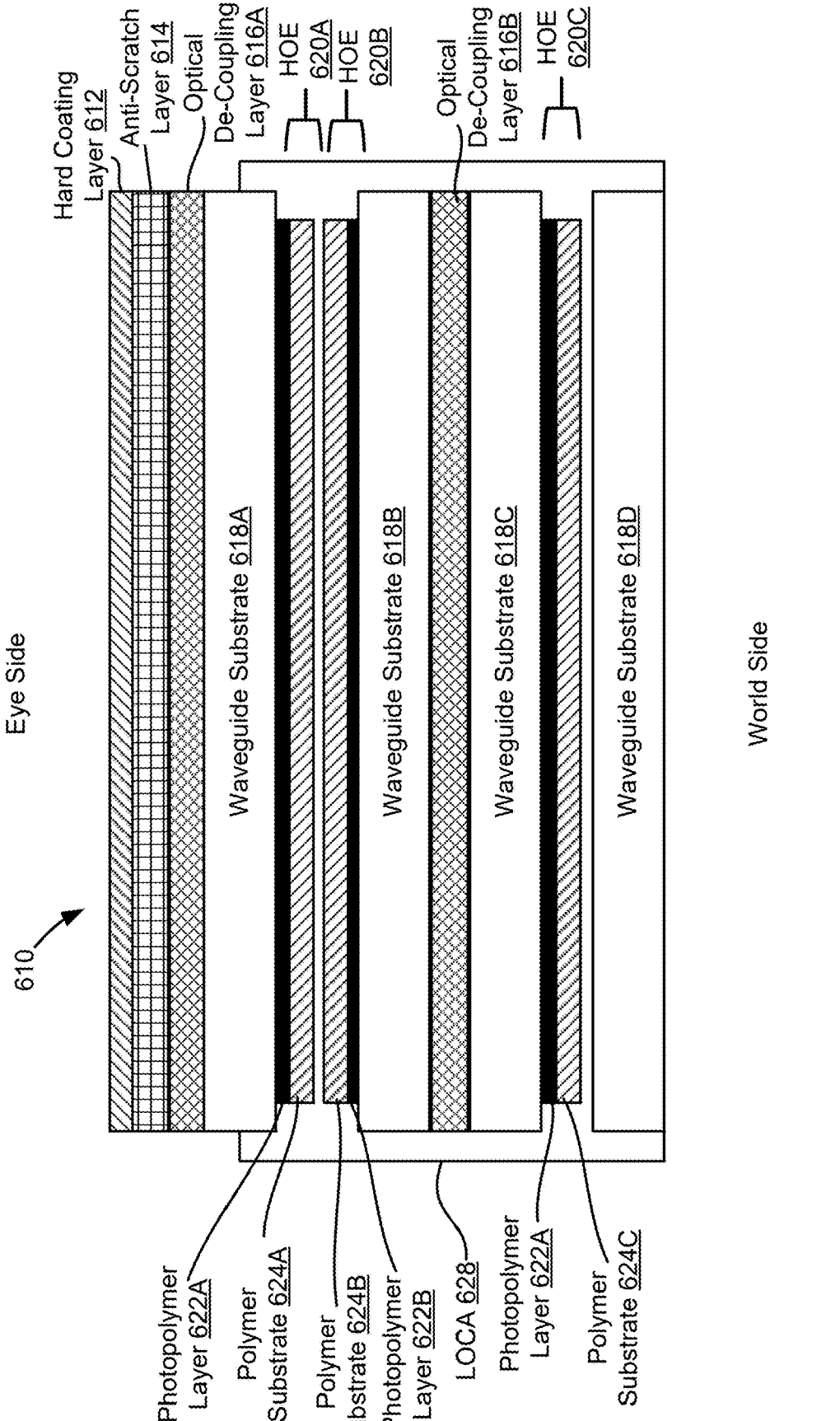
FIG. 6 illustrates another example of an optical waveguide combiner system in accordance with an embodiment of the disclosure.

FIG. 6 illustrates another example of an optical waveguide combiner system 610 in accordance with an embodiment of the disclosure. The optical waveguide combiner system 610 is an example of the optical waveguide combiner system 110 in FIG. 1. Here, and unlike the embodiment shown in FIG. 5, a waveguide substrate (a plastic waveguide or any other waveguide substrate lighter than glass and having better shattering properties than glass) can be added to be near or a real-world side.

Going from a user-facing side (e.g., eye side) of the optical waveguide combiner system 610 towards a world-facing side of the optical waveguide combiner system 610, the optical waveguide combiner system 610 includes a hard coating layer 612, an anti-scratch layer 614, an optical de-coupling layer 616A, a waveguide substrate 618A, a holographic optical element 620A, a holographic optical element 620B, a waveguide substrate 618B, an optical de-coupling layer 616B, a waveguide substrate 618C, a holographic optical element 620C, and a waveguide substrate 618D. In addition, the optical waveguide combiner system 610 can include a LOCA 628 that is used to couple each of the layers together.

The hard coating layer 612, the anti-scratch layer 614, and the optical de-coupling layers 616A-616B are examples of the hard coating layer 412 in FIG. 4, the anti-scratch layer 414 in FIG. 4, and the optical de-coupling layer 416 in FIG. 4, respectively. In addition, the holographic optical elements 620A-620C are examples of the holographic optical elements 420A-420C in FIG. 4, respectively, the waveguide substrates 618A-618D are examples of the waveguide substrates 418A-418D in FIG. 4, and the LOCA 628 is an example of the LOCA 428 in FIG. 4.

As illustrated in FIG. 6, a top surface of the waveguide substrate 618A is coupled to a bottom surface of the optical de-coupling layer 616A and a bottom surface of the waveguide substrate 618A is coupled to the holographic optical element 620A. A photopolymer layer 622A of the holographic optical element 620A is coupled to the bottom surface of the waveguide substrate 618A and to an upper surface of a polymer substrate 624A. The photopolymer layer 622A may be a red photopolymer layer. In addition, a top surface of the waveguide substrate 618B is coupled to the holographic optical element 620B. A photopolymer layer 622B of the holographic optical element 620B is coupled to a top surface of the waveguide substrate 618B and to a bottom surface of the polymer substrate 624B. The photopolymer layer 622B may be a blue photopolymer layer.

The bottom surface of the waveguide substrate 618B is coupled to a top surface of the optical de-coupling layer 616B, and a bottom surface of the optical de-coupling layer 616B is coupled to a top surface of the waveguide substrate 618C. A bottom surface of the waveguide substrate 618C is coupled to the holographic optical element 620C. A photopolymer layer 622C of the holographic optical element 620C is coupled to the bottom surface of the waveguide substrate 618C and to an upper surface of a polymer substrate 624C. The photopolymer layer 622C may be a green photopolymer layer.

In an example, the waveguide substrate 618A and the waveguide substrate 619D may be plastic waveguide substrates, whereas the waveguide substrates 618B-618C may be glass waveguide substrates. In such an example, if either of the waveguide substrates 618B-618C were to shatter, the glass may be contained within the plastic waveguide substrates, reducing a likelihood that glass enters an eye of a user.

FIG. 7 illustrates another example of an optical waveguide combiner system 710 in accordance with an embodiment of the disclosure. The optical waveguide combiner system 710 is an example of the optical waveguide combiner system 110 in FIG. 1. Here, and unlike the embodiments shown in FIGS. 4-6, holographic optical elements are arranged to reduce the number of waveguide substrates. An example arrangement includes attaching holographic optical elements to each other.

Going from a user-facing side (e.g., eye side) of the optical waveguide combiner system 710 towards a world-facing side of the optical waveguide combiner system 710, the optical waveguide combiner system 710 includes a hard coating layer 712, an anti-scratch layer 714, an optical de-coupling layer 716A, a waveguide substrate 718A, a holographic optical element 720A, a holographic optical element 720B, an optical de-coupling layer 716B, a holographic optical element 720C, and a waveguide substrate 718B.

The hard coating layer 712, the anti-scratch layer 714, and the optical de-coupling layers 716A-716B are examples of the hard coating layer 412 in FIG. 4, the anti-scratch layer 414 in FIG. 4, and the optical de-coupling layer 416 in FIG. 4, respectively. In addition, the holographic optical elements 720A-720C are examples of the holographic optical elements 420A-420C in FIG. 4, respectively, and the waveguide substrates 718A-718B are examples of the waveguide substrates 418A-418D in FIG. 4.

As illustrated in FIG. 7, a first surface (e.g., top surface) of the waveguide substrate 718A is coupled to a bottom surface of the optical de-coupling layer 716A and a second surface (e.g., bottom surface) of the waveguide substrate 718A that is opposite the first surface is coupled to the holographic optical element 720A. A polymer substrate 724A of the holographic optical element 720A includes a first surface (e.g., top surface) and a second surface (e.g., bottom surface) opposite the first surface. A photopolymer layer 722A of the holographic optical element 720A is coupled to the second surface of the waveguide substrate 718A and to the first surface of a polymer substrate 724A. The photopolymer layer 722A may be a red photopolymer layer. In addition, a photopolymer layer 722B of the holographic optical element 720B is coupled to the second surface of the polymer substrate 724A and to a surface (e.g., top surface) of a polymer substrate 724B of the holographic optical element 720B. The photopolymer layer 722B may be a blue photopolymer layer. The holographic optical elements 720A-720B can be disposed between the waveguide substrates 718A-718B.

In an example, another surface (e.g., bottom surface) of the polymer substrate 724B is coupled to a first surface (e.g., top surface) of the optical de-coupling layer 716B. A second surface (e.g., bottom surface) of the optical de-coupling layer 716B is coupled to a first surface (e.g., top surface) of a polymer substrate 724C of the holographic optical element 720C. Accordingly, the optical de-coupling layer 716B is disposed between the holographic optical elements 720B-720C. A bottom surface of the polymer substrate 724C is coupled to a top surface of a photopolymer layer 722C of the holographic optical element 720C. A bottom surface of the photopolymer layer 722C is coupled to a surface of the waveguide substrate 718B. Accordingly, the holographic optical element 720C is also disposed between the waveguide substrates 718A-718B. In an example, the photopolymer layer 722C may be a green photopolymer layer.

The waveguide substrates 718A-718B may both be plastic waveguide substrates, may both be glass waveguide substrates, or one may be glass and one may be plastic. In an example, at least one of the waveguide substrates 718A-718B is a plastic waveguide substrate. For instance, the waveguide substrate 718A may be a plastic waveguide substrate and the waveguide substrate 718B may be a glass waveguide substrate.

In an example, the photopolymer layer 722A may be configured to multiplex first light characterized by a first wavelength range (e.g., a red wavelength range) and second light characterized by a second wavelength range (e.g., a blue wavelength range) different from the first wavelength range. Accordingly, the photopolymer layer 722B may not be present. In this case, the photopolymer layer 722A may be a transfer grade photopolymer or a liquid grade photopolymer attached directly to the waveguide substrate 718A and characterized by a modulation index (e.g., less than 0.07).

In an example, the holographic optical element 720C may include the photopolymer layer 722C but exclude the polymer substrate 724C. So, the photopolymer layer 722C can be coupled to the optical de-coupling layer 716B and the waveguide substrate 718B. The photopolymer layer 722C may be a transfer grade photopolymer or a liquid grade photopolymer.

Figure 8:
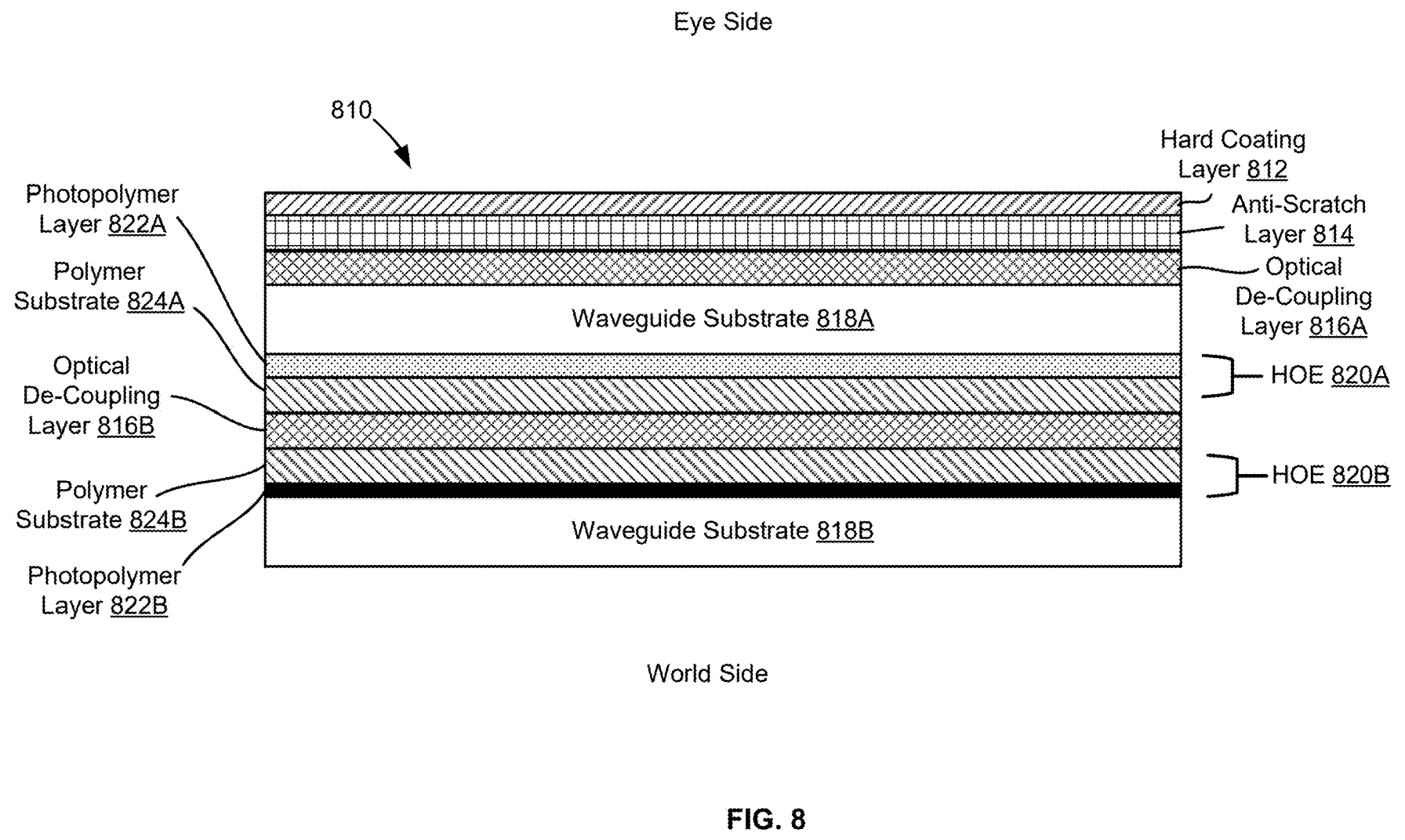

FIG. 8 illustrates another example of an optical waveguide combiner system 810 in accordance with an embodiment of the disclosure. The optical waveguide combiner system 810 is an example of the optical waveguide combiner system 110 in FIG. 1. Here, to reduce thickness and weight, a multiplexing photopolymer layer can be used.

Going from a user-facing side (e.g., eye side) of the optical waveguide combiner system 810 towards a world-facing side of the optical waveguide combiner system 810, the optical waveguide combiner system 810 includes a hard coating layer 812, an anti-scratch layer 814, an optical de-coupling layer 816A, a waveguide substrate 818A, a holographic optical element 820A, an optical de-coupling layer 816B, a holographic optical element 820B, and a waveguide substrate 818B.

The hard coating layer 812, the anti-scratch layer 814, and the optical de-coupling layers 816A-816B are examples of the hard coating layer 412 in FIG. 4, the anti-scratch layer 414 in FIG. 4, and the optical de-coupling layer 416 in FIG. 4, respectively. In addition, the holographic optical elements 820A-820B are examples of the holographic optical elements 420A-420C in FIG. 4, respectively, and the waveguide substrates 818A-818B are examples of the waveguide substrates 418A-418D in FIG. 4.

As illustrated in FIG. 8, a first surface (e.g., top surface) of the waveguide substrate 818A is coupled to a bottom surface of the optical de-coupling layer 816A and a second surface (e.g., bottom surface) of the waveguide substrate 818A that is opposite the first surface is coupled to the holographic optical element 820A. A polymer substrate 824A of the holographic optical element 820A includes a first surface (e.g., top surface) and a second surface (e.g., bottom surface) opposite the first surface. A photopolymer layer 822A of the holographic optical element 820A is coupled to the second surface of the waveguide substrate 818A and to the first surface of a polymer substrate 824A. The photopolymer layer 822A may be configured to multiplex light from different wavelength ranges and characterized by a modulation index (e.g., between 0.04 and 0.07). For instance, the photopolymer layer 822A may multiplex light in a red wavelength range and light in a blue wavelength range. The photopolymer layer 822A multiplexes first light and second light (e.g., blue and red lights) by receiving and optically coupling the first light and second light to the waveguide substrate 818A, such that these two lights are injected into the waveguide substrate 818A and can be propagated within the waveguide substrate 818A according to TIR. Generally, the first light is characterized by a first wavelength within a first wavelength range, and the second light is characterized by a second wavelength within a non-overlapping second wavelength range.

In an example, the second surface of the polymer substrate 824A is coupled to a first surface (e.g., top surface) of the optical de-coupling layer 816B. A second surface (e.g., bottom surface) of the optical de-coupling layer 816B is coupled to a first surface (e.g., top surface) of a polymer substrate 824B of the holographic optical element 820B. Accordingly, the optical de-coupling layer 816B is disposed between the holographic optical elements 820A-820B. A bottom surface of the polymer substrate 824B is coupled to a top surface of a photopolymer layer 822B of the holographic optical element 820B. A bottom surface of the photopolymer layer 822B is coupled to a surface of the waveguide substrate 818B. Accordingly, the holographic optical elements 820A-820B are disposed between the waveguide substrates 818A-818B.

The waveguide substrates 818A-818B may both be plastic waveguide substrates, may both be glass waveguide substrates, or one may be glass and one may be plastic. In an example, at least one of the waveguide substrates 818A-818B is a plastic waveguide substrate. For instance, the waveguide substrate 818A may be a plastic waveguide substrate and the waveguide substrate 818B may be a glass waveguide substrate.

FIG. 9 illustrates another example of an optical waveguide combiner system 910 in accordance with an embodiment of the disclosure. The optical waveguide combiner system 910 is an example of the optical waveguide combiner system 110 in FIG. 1. Here, to reduce thickness and/or weight, a holographic optical element can be configured (e.g., via a manufacturing process) to include a photopolymer film and to exclude a polymer substrate.

Going from a user-facing side (e.g., eye side) of the optical waveguide combiner system 910 towards a world-facing side of the optical waveguide combiner system 910, the optical waveguide combiner system 910 includes a hard coating layer 912, an anti-scratch layer 914, an optical de-coupling layer 916A, a waveguide substrate 918A, a holographic optical element 920A, an optical de-coupling layer 916B, a holographic optical element 920B, an optical de-coupling layer 916C, a holographic optical element 920C, and a waveguide substrate 918B.

The hard coating layer 912, the anti-scratch layer 914, and the optical de-coupling layers 916A-916C are examples of the hard coating layer 412 in FIG. 4, the anti-scratch layer 414 in FIG. 4, and the optical de-coupling layer 416 in FIG. 4, respectively. In addition, the holographic optical elements 920A-920C are examples of the holographic optical elements 420A-420C in FIG. 4, respectively, and the waveguide substrates 918A-918B are examples of the waveguide substrates 418A-418D in FIG. 4.

In an example, the holographic optical element 920A can include a photopolymer layer 922A but exclude a polymer substrate. In addition, the holographic optical element 920B can include a photopolymer layer 922B. The photopolymer layer 922A can be attached to the waveguide substrate 918A and to either the holographic optical element 920B or the optical de-coupling layer 916B. In FIG. 9, a bottom surface of the photopolymer layer 922A is coupled to a top surface of the optical de-coupling layer 916B. Each of the holographic optical elements 920A-920B are disposed between the waveguide substrates 918A-918B.

As illustrated in FIG. 9, a first surface (e.g., top surface) of the waveguide substrate 918A is coupled to a bottom surface of the optical de-coupling layer 916A and a second surface (e.g., bottom surface) of the waveguide substrate 918A that is opposite the first surface is coupled to the holographic optical element 920A. The photopolymer layer 922A of the holographic optical element 920A is coupled to the second surface of the waveguide substrate 918A and to the top surface of the optical de-coupling layer 916B. The photopolymer layer 922A may be a red photopolymer layer.

A bottom surface of the optical de-coupling layer 916B is coupled to a top surface of the photopolymer layer 922B. So, the optical de-coupling layer 916B is disposed between the photopolymer layers 922A-922B. The photopolymer layer 922B may be a blue photopolymer layer. The bottom surface of the photopolymer layer 922B is coupled to a top surface of a polymer substrate 924 of the holographic optical element 920B.

In an example, a bottom surface of the polymer substrate 924 is coupled to a first surface (e.g., top surface) of the optical de-coupling layer 916C. A second surface (e.g., bottom surface) of the optical de-coupling layer 916C is coupled to a first surface (e.g., top surface) of a photopolymer layer 922C of the holographic optical element 920C. Accordingly, the optical de-coupling layer 916C is disposed between the holographic optical elements 920B-920C. A bottom surface of the photopolymer layer 922C is coupled to a surface of the waveguide substrate 918B. Accordingly, the holographic optical element 920C is also disposed between the waveguide substrates 918A-918B. In an example, the photopolymer layer 922C may be a green photopolymer layer. Although not shown in FIG. 9, the holographic optical element 920C may include a polymer substrate coupled to the photopolymer layer 922C.

The waveguide substrates 918A-918B may both be plastic waveguide substrates, may both be glass waveguide substrates, or one may be glass and one may be plastic. In an example, at least one of the waveguide substrates 918A-918B is a plastic waveguide substrate. For instance, the waveguide substrate 918A may be a plastic waveguide substrate and the waveguide substrate 918B may be a glass waveguide substrate.

In an example, the photopolymer layer 922A may be configured to multiplex first light characterized by a first wavelength range (e.g., a red wavelength range) and second light characterized by a second wavelength range (e.g., a blue wavelength range) different from the first wavelength range. Accordingly, the photopolymer layer 922B may not be present.

In an example, the photopolymer layer 922A and the photopolymer layer 922C may be transfer grade photopolymers or a liquid grade photopolymer. So, the photopolymer layer 922A can be directly attached to the waveguide substrate 918A and the photopolymer layer 922C can be directly attached to the waveguide substrate 918B.

Figure 10:
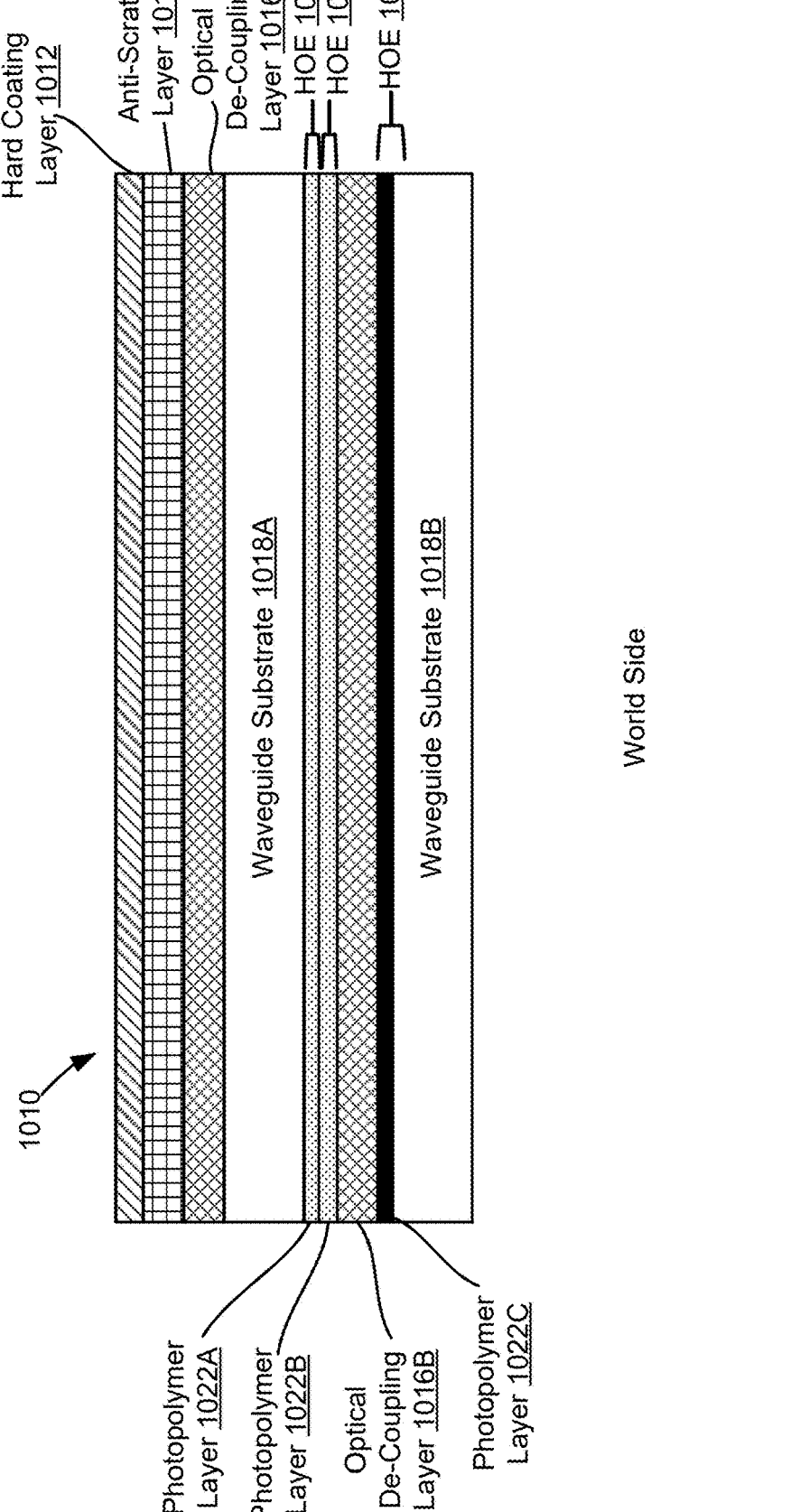
FIG. 10 illustrates another example of an optical waveguide combiner system in accordance with an embodiment of the disclosure.

FIG. 10 illustrates another example of an optical waveguide combiner system 1010 in accordance with an embodiment of the disclosure. The optical waveguide combiner system 1010 is an example of the optical waveguide combiner system 110 in FIG. 1. Here, to reduce thickness and/or weight, a holographic optical element can be configured (e.g., via a manufacturing process) to include a photopolymer film and to exclude a polymer substrate. Unlike the embodiments illustrated in FIG. 9, two photopolymers can be directly attached to each other.

Going from a user-facing side (e.g., eye side) of the optical waveguide combiner system 1010 towards a world-facing side of the optical waveguide combiner system 1010, the optical waveguide combiner system 1010 includes a hard coating layer 1012, an anti-scratch layer 1014, an optical de-coupling layer 1016A, a waveguide substrate 1018A, a holographic optical element 1020A, a holographic optical element 1020B, an optical de-coupling layer 1016B, a holographic optical element 1020C, and a waveguide substrate 1018B.

The hard coating layer 1012, the anti-scratch layer 1014, and the optical de-coupling layers 1016A-1016B are examples of the hard coating layer 412 in FIG. 4, the anti-scratch layer 414 in FIG. 4, and the optical de-coupling layer 416 in FIG. 4, respectively. In addition, the holographic optical elements 1020A-1020B are examples of the holographic optical elements 420A-420C in FIG. 4, respectively, and the waveguide substrates 1018A-1018B are examples of the waveguide substrates 418A-418D in FIG. 4.

In an example, the holographic optical element 1020A can include a photopolymer layer 1022A but exclude a polymer substrate. In addition, the holographic optical elements 1020B-1020C can include photopolymer layer 1022B-1022C and exclude a polymer substrate. The photopolymer layer 1022A can be attached to the waveguide substrate 1018A and to either the holographic optical element 1020B or the optical de-coupling layer 1016B. In FIG. 10, the photopolymer layer 1022A is attached to a top surface of the holographic optical element 1020B. Each of the photopolymer layers 1022A-1022B may be transfer grade photopolymers or liquid grade photopolymers. Each of the holographic optical elements 1020A-1020B are disposed between the waveguide substrates 1018A-1018B.

In some instances, photopolymer layer 1022A can multiplex light in multiple wavelength ranges. So, the photopolymer layers 1022A-1022B may be replaced with photopolymer layer 822A in FIG. 8. As an example, the photopolymer layer 1022A may multiplex light in a red wavelength range and light in a blue wavelength range.

As illustrated in FIG. 10, a first surface (e.g., top surface) of the waveguide substrate 1018A is coupled to a bottom surface of the optical de-coupling layer 1016A and a second surface (e.g., bottom surface) of the waveguide substrate 1018A that is opposite the first surface is coupled to the holographic optical element 1020A. The photopolymer layer 1022A of the holographic optical element 1020A is coupled to the second surface of the waveguide substrate 1018A and to a top surface of the photopolymer layer 1022B of the holographic optical element 1020B. A bottom surface of the photopolymer layer 1022B is coupled to the top surface of the optical de-coupling layer 1016B. A bottom surface of the optical de-coupling layer 1016B is coupled to a top surface of the photopolymer layer 1022C. So, the optical de-coupling layer 1016B is disposed between the photopolymer layers 1022B-1022C. The photopolymer layer 1022C may be a green photopolymer layer. A bottom surface of the photopolymer layer 1022C is coupled to a surface of the waveguide substrate 1018B. Accordingly, the holographic optical element 1020C is also disposed between the waveguide substrates 1018A-1018B.

The waveguide substrates 1018A-1018B may both be plastic waveguide substrates, may both be glass waveguide substrates, or one may be glass and one may be plastic. In an example, at least one of the waveguide substrates 1018A-1018B is a plastic waveguide substrate. For instance, the waveguide substrate 1018A may be a plastic waveguide substrate and the waveguide substrate 1018B may be a glass waveguide substrate.

Figure 11:
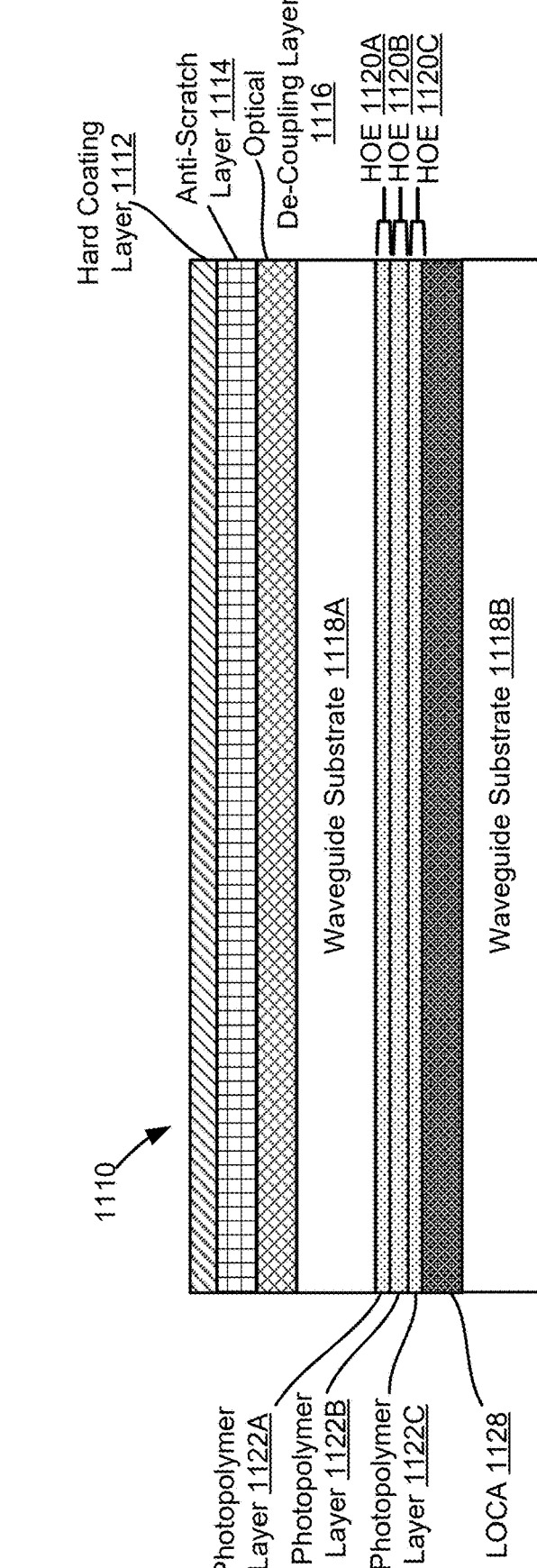
FIG. 11 illustrates another example of an optical waveguide combiner system in accordance with an embodiment of the disclosure.

FIG. 11 illustrates another example of an optical waveguide combiner system 1110 in accordance with an embodiment of the disclosure. The optical waveguide combiner system 1110 is an example of the optical waveguide combiner system 110 in FIG. 1. Here, to reduce thickness and/or weight, a holographic optical element can be configured (e.g., via a manufacturing process) to include a photopolymer film and to exclude a polymer substrate. Unlike the embodiments illustrated in FIG. 10, three photopolymers can be directly attached to each other.

Going from a user-facing side (e.g., eye side) of the optical waveguide combiner system 1110 towards a world-facing side of the optical waveguide combiner system 1110, the optical waveguide combiner system 1110 includes a hard coating layer 1112, an anti-scratch layer 1114, an optical de-coupling layer 1116, a waveguide substrate 1118A, a holographic optical element 1120A, a holographic optical element 1120B, a holographic optical element 1120C, a LOCA 1128, and a waveguide substrate 1118B.

The hard coating layer 1112, the anti-scratch layer 1114, and the optical de-coupling layer 1116 are examples of the hard coating layer 412 in FIG. 4, the anti-scratch layer 414 in FIG. 4, and the optical de-coupling layer 416 in FIG. 4, respectively. In addition, the holographic optical elements 1120A-1120C are examples of the holographic optical elements 420A-420C in FIG. 4, respectively, and the waveguide substrates 1118A-1118B are examples of the waveguide substrates 418A-418D in FIG. 4.

In an example, the holographic optical element 1120A can include a photopolymer layer 1122A but exclude a polymer substrate. In addition, the holographic optical elements 1120B-1120C can include photopolymer layers 1122B-1122C and exclude a polymer substrate. The photopolymer layer 1122A can be attached to the waveguide substrate 1118A and to the top surface of the holographic optical element 1120B. The holographic optical element 1120B is also attached to a top surface of the holographic element 1120C. Each of the photopolymer layers 1122A-1122C may be transfer grade photopolymers or liquid grade photopolymers. Each of the holographic optical elements 1120A-1120C are disposed between the waveguide substrates 1118A-1118B.

As illustrated in FIG. 11, a first surface (e.g., top surface) of the waveguide substrate 1118A is coupled to a bottom surface of the optical de-coupling layer 1116 and a second surface (e.g., bottom surface) of the waveguide substrate 1118A that is opposite the first surface is coupled to the holographic optical element 1120A. The photopolymer layer 1122A of the holographic optical element 1120A is coupled to the second surface of the waveguide substrate 1118A and to a top surface of the photopolymer layer 1122B of the holographic optical element 1120B. A bottom surface of the photopolymer layer 1122B is coupled to the top surface of the photopolymer layer 1122C of the holographic optical element 1120C. A bottom surface of the photopolymer layer 1122C is coupled to a top surface of the LOCA 1128. The photopolymer layer 1122A may be a red photopolymer layer, the photopolymer layer 1122B may be a blue photopolymer layer, and the photopolymer layer 1122C may be a green photopolymer layer. A bottom surface of the LOCA 1128 is coupled to a surface of the waveguide substrate 1118B.

The waveguide substrates 1118A-1118B may both be plastic waveguide substrates, may both be glass waveguide substrates, or one may be glass and one may be plastic. In an example, at least one of the waveguide substrates 1118A-1118B is a plastic waveguide substrate. For instance, the waveguide substrate 1118A may be a plastic waveguide substrate and the waveguide substrate 1118B may be a glass waveguide substrate.

Although not illustrated in the figures, in an example, the coupling of the photopolymer layer 1122B to photopolymer layer 1122C may also apply to FIG. 9. So, photopolymer layer 922B may be coupled to the optical de-coupling layer 916B and the photopolymer layer 922C, which can also be coupled to the polymer substrate 924. In this case, the optical de-coupling layer 916C may be replaced with a LOCA.

Figure 12:
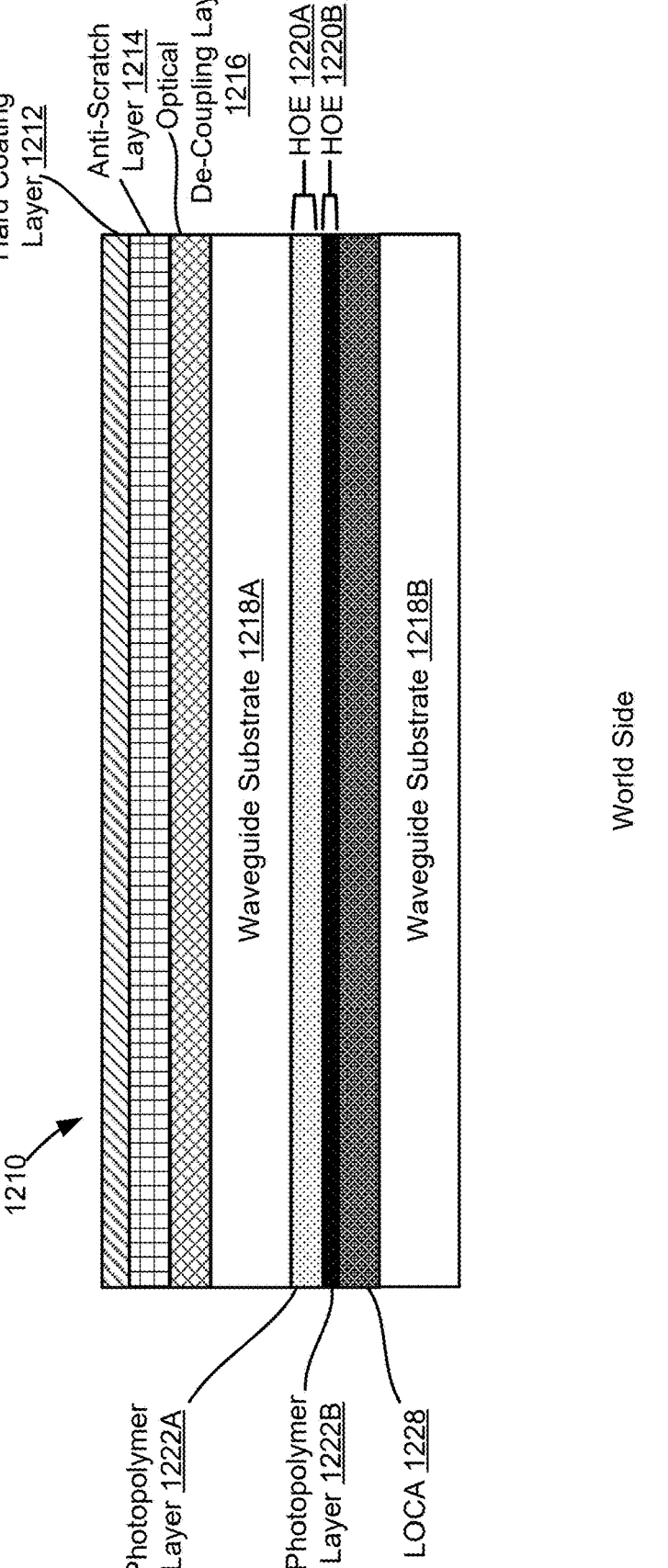
FIG. 12 illustrates another example of an optical waveguide combiner system in accordance with an embodiment of the disclosure.

FIG. 12 illustrates another example of an optical waveguide combiner system 1210 in accordance with an embodiment of the disclosure. The optical waveguide combiner system 1210 is an example of the optical waveguide combiner system 110 in FIG. 1. Here, to reduce thickness and/or weight, a holographic optical element can be configured (e.g., via a manufacturing process) to include a photopolymer film and to exclude a polymer substrate.

Going from a user-facing side (e.g., eye side) of the optical waveguide combiner system 1210 towards a world-facing side of the optical waveguide combiner system 1210, the optical waveguide combiner system 1210 includes a hard coating layer 1212, an anti-scratch layer 1214, an optical de-coupling layer 1216, a waveguide substrate 1218A, a holographic optical element 1220A, a holographic optical element 1220B, a LOCA 1228, and a waveguide substrate 1218B.

The hard coating layer 1212, the anti-scratch layer 1214, and the optical de-coupling layer 1216 are examples of the hard coating layer 412 in FIG. 4, the anti-scratch layer 414 in FIG. 4, and the optical de-coupling layer 416 in FIG. 4, respectively. In addition, the holographic optical elements 1220A-1220B are examples of the holographic optical elements 420A-420C in FIG. 4, respectively, and the waveguide substrates 1218A-1218B are examples of the waveguide substrates 418A-418D in FIG. 4.

In some instances, the holographic optical element 1220A may include a photopolymer layer 1122A that can multiplex light in multiple wavelength ranges. As an example, the photopolymer layer 1122A may multiplex light in a red wavelength range and light in a blue wavelength range.

In an example, the holographic optical element 1220A can include the photopolymer layer 1222A but exclude a polymer substrate. In addition, the holographic optical element 1220B can include photopolymer layers 1222B and exclude a polymer substrate. The photopolymer layer 1222A can be attached to the waveguide substrate 1218A and to the top surface of the holographic optical element 1220B. Each of the photopolymer layers 1222A-1222B may be transfer grade photopolymers or liquid grade photopolymers. Each of the holographic optical elements 1220A-1220B are disposed between the waveguide substrates 1218A-1218B.

As illustrated in FIG. 12, a first surface (e.g., top surface) of the waveguide substrate 1218A is coupled to a bottom surface of the optical de-coupling layer 1216 and a second surface (e.g., bottom surface) of the waveguide substrate 1218A that is opposite the first surface is coupled to the holographic optical element 1220A. The photopolymer layer 1222A of the holographic optical element 1220A is coupled to the second surface of the waveguide substrate 1218A and to a top surface of the photopolymer layer 1222B of the holographic optical element 1220B. A bottom surface of the photopolymer layer 1222B is coupled to the top surface of the LOCA 1228. The photopolymer layer 1222A may be a red and blue multiplexing photopolymer layer and the photopolymer layer 1222B may be a green photopolymer layer. A bottom surface of the LOCA 1228 is coupled to a surface of the waveguide substrate 1218B.

The waveguide substrates 1218A-1218B may both be plastic waveguide substrates, may both be glass waveguide substrates, or one may be glass and one may be plastic. In an example, at least one of the waveguide substrates 1218A-1218B is a plastic waveguide substrate. For instance, the waveguide substrate 1218A may be a plastic waveguide substrate and the waveguide substrate 1218B may be a glass waveguide substrate.

While the examples of optical waveguide combiner systems provided in FIGS. 4-12 provide particular arrangements of components, the embodiments are not limited as such. For instance, combinations of one or more of the arrangements are also possible. In addition, while each of FIGS. 4-12 describe polychromatic examples, where different holographic optical elements are used for different wavelength ranges, the embodiments may alternatively be monochromatic. In such cases, only one holographic optical element may be used according to any of the above embodiments.

Furthermore, although the stack arrangements described in FIGS. 4-12 are illustrated in connection with a user-facing side and world-facing side, the stacking can be in the reverse order. In particular, any of the stacks can be re-arranged such that the illustrated user-side can be substituted with a world-side and the illustrated world-side can be substituted with a use-side.

In an example, and referring back to FIG. 4, the photopolymer layer 422B is shown as being attached to the bottom surface of the polymer substrate 424B. In a variation to this configuration, the photopolymer layer 422B can be instead attached to the top surface of the polymer substrate 424B such that the photopolymer layer 422B is in contact with the polymer substrate 424A and is sandwiched between the polymer substrate 424A and the polymer substrate 424B. In this variation, an optically clear adhesive (e.g., LOCA) can be used between the bottom surface of the polymer substrate 424B and the waveguide substrate 418B. Similar variations can be used in the configuration illustrated in the other figures including the ones of FIGS. 5 and 6.

In the previous figures, various layers (e.g., layers 412-418D) are described as being coupled to each other. When two layers are adjacent to each other and are described to be coupled to each other, these layers can be said to be in direct contact. In the figures, two layers are shown to be in direct contact by illustrating one of them being disposed on the other one (where the direction of disposition is referenced herein from the eye facing side towards the world facing side, although the opposite direction is likewise possible).

Figure 13:
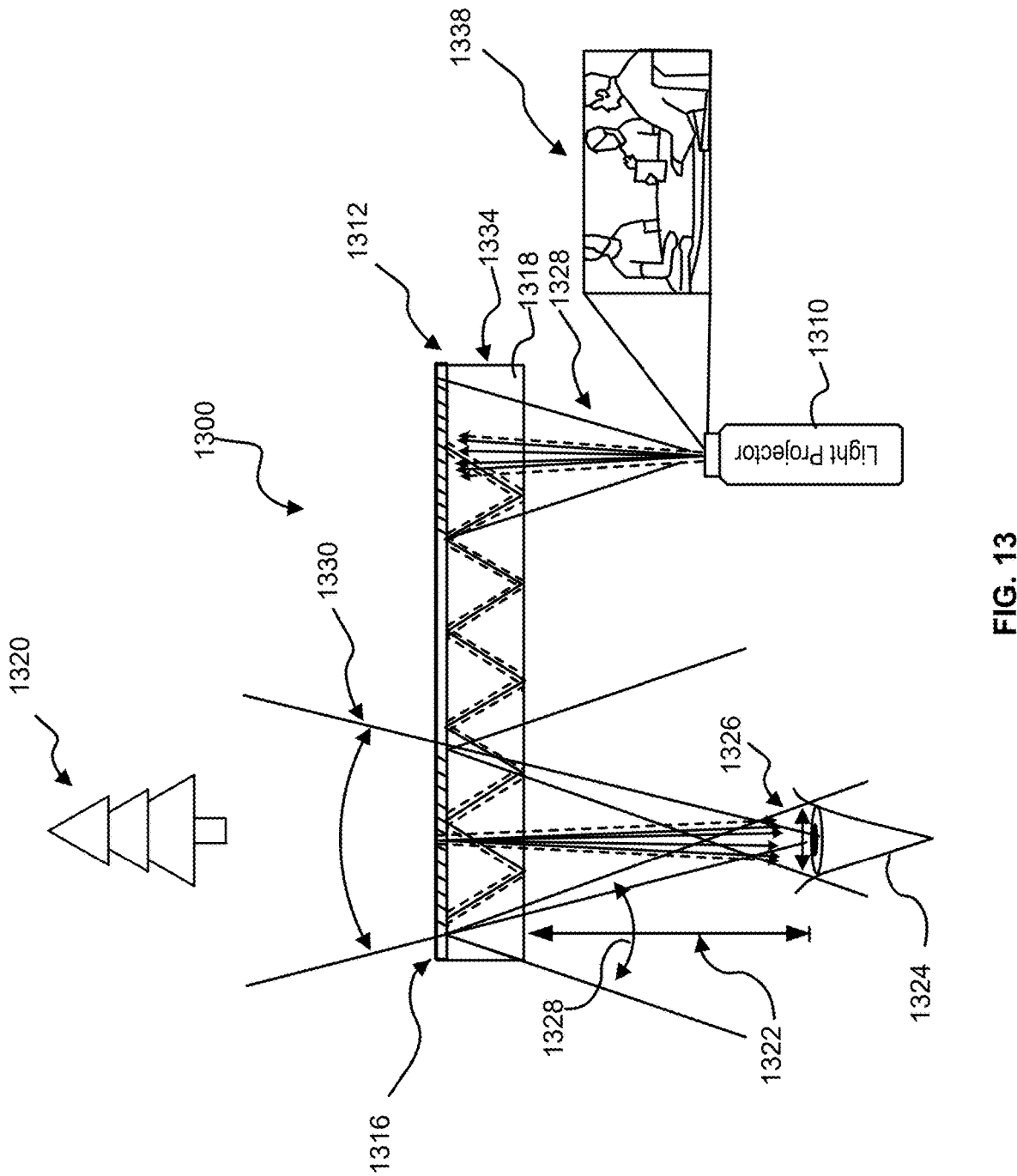
FIG. 13 illustrates a schematic of a system of a waveguide combiner in accordance with an embodiment of the present disclosure.

FIG. 13 illustrates a schematic of a system of an optical lens set and image combiner in accordance with an embodiment of the present disclosure. An optical system 1300 can be used in mixed reality display, such as a heads-up display or an augmented reality display. The optical system 1300 includes an optical combiner 1334, which can be an example or a component of any of the optical waveguide combiner systems described herein above. Pupil replication decouples the pupil size from the field of view, which are otherwise inversely linked in other types of mixed reality systems. This advantage means that the optical combiner based displays can offer a large eye box together with a large image field of view. In an example, the optical combiner 1334 may be a waveguide optical combiner. Nonetheless, other optical combiner types are possible, such as a holographic optical element-based combiner, or any other suitable optical combiner, in other examples.

Pupil replication in the optical combiner 1334 can be obtained when the image that is propagating inside the optical combiner 1334 is only partially extracted (or redirected) by the optical combiner 1334. When this happens, the remainder of the light keeps propagating in its original direction inside the optical combiner 1334. The remaining light bounces on the outer surface of the optical combiner 1334 and then interacts again with the holographic optical element, where another portion is extracted (or redirected). Successive extractions of the light replicate the pupil multiple times.

The optical combiner 1334 can be built using waveguide holography. This technique uses an injection hologram 1312 to trap auxiliary content 1338 (e.g., projector-emitted light representing virtual images) inside a substrate 1318 (which may be a plastic waveguide substrate) through total internal reflection. The auxiliary content 1338 can be generated by a light projector 1310 (e.g., a light engine configured as a light source). In the substrate 1318, the auxiliary content 1338 propagates away from the light projector 1310 and is out-coupled toward a viewer's eye 1324 by an extraction hologram 1316. The extraction hologram 1316 can be characterized by a varying diffraction efficiency such that output light rays extracted by the extraction hologram 1316 have a homogenous intensity. A hologram represents a functional diffractive structure that transforms the waveform of the input beam into an output beam. A VHOE is a type of hologram that operates in the Bragg diffraction regime. The optical combiner 1334 represents the optical elements in the optical path from the exit aperture of the light projector 1310 to the plane where light enters the viewer's eye 1324. Both the injection hologram 1312 and the extraction hologram 1316 are transparent across the entire or a predefined visible range except for a percent reduction (depending on different parameters such as the type materials used, thickness, etc.) in transmission across the bandwidth of the broadband red-green-blue (RGB) light sources. This allows the viewer to see real imagery 1320 and the auxiliary content 1338. The light projector 1310 and the extraction hologram 1316 emit within a cone of light 1328.

Although FIG. 13 illustrates the injection hologram 1312 and the extraction hologram 1316 to be on a same side of the substrate 1318, embodiments of the present disclosure are not limited as such. For instance, the injection hologram 1312 and the extraction hologram 1316 can be on opposite sides of the substrate 1318. Generally, the injection hologram 1312 is coupled to an input surface of the substrate 1318 by, for instance, being mounted to and attached to the input surface. Likewise, the extraction hologram 1316 is coupled to an output surface of the substrate 1318 by, for instance, being mounted to and attached to the output surface. The input surface corresponds to a surface where light from the light projector 1310 is received. The output surface corresponds to a surface from which light is emitted from the substrate 1318.

The optical combiner 1334 can form the eye box 1326 in the horizontal and vertical directions. The eye box 1326 can correspond to the vertical and horizontal distance where the viewer's pupil receives all the angles emitted by the light projector 1310. As the viewer's pupil moves outside the eye box 1326, the image becomes degraded. Eye relief 1322 is the distance between the substrate surface and the entrance pupil of the viewer's eye 1324. For maximum comfort, this distance should be larger than a minimum threshold distance. The field-of-view 1330 is the angular size of the image determined by the geometric relationship between the size of the extraction hologram 1316 and the distance between the pupil and the surface of the extraction hologram 1316.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of in-coupling into substrate modes (light propagating through total internal reflection).

A properly designed optical combiner 1334 can have a high transmission (e.g., at least 80%) of the light from the real imagery 1320, a large auxiliary field of view diagonally, vertically and horizontally, a large eye box, and an ability to accept the auxiliary content 1338 from broadband light emitting diode RGB inputs. To build such an optical wave-guide combiner, several issues can be addressed.

Light projectors are designed to achieve a certain white balance (the ratio between the primary emission wave-lengths that provide a natural looking image-white balance is typically expressed in degrees Kelvin of a black body source producing the same spectral distribution). The optical combiner 1334 maintains the white balance of the light projector 1310 along the optical path to the viewer's eye 1324.

While either transmission or reflection holographic opti-cal element can be implemented in the display to produce a large field of view, reflection holographic optical elements can provide a large horizontal field of view. Transmission holographic optical elements can be used in the optical combiner 1334 when the angular requirements on the field of views are smaller. Both horizontal and vertical field of views can be limited by the distance from the aperture stop of the light projector 1310 to the center of the extraction hologram 1316. In order for NTE glasses to accommodate size, weight, and power restrictions, the size of the light projector 1310 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical combiner 1334. This is because the light forming the image experiences multiple bounces in the direction of the extrac-tion hologram 1316 and multiple light extractions can expand the eye box 1326. In particular, a portion of the light can be extracted and output by each of the diffraction gratings of the extraction hologram 1316.

The arrangement of components of the optical system 1300 is provided for illustrative purposes. Different possible of such components are possible. For example, the eye box 1326 can be centered, positioned near center, or positioned at a particular distance from the center of the optical combiner 1334.

Figure 14:
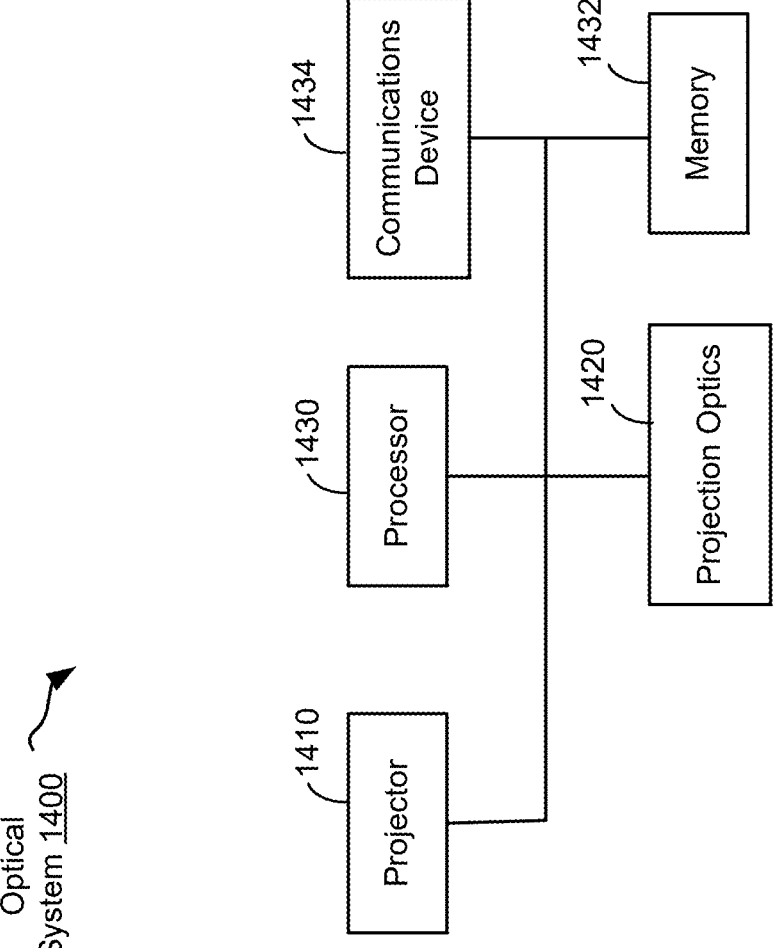
FIG. 14 illustrates a schematic diagram of an optical system in accordance with an embodiment of the present disclosure.

FIG. 14 illustrates a schematic diagram of an optical system 1400 system in accordance with an embodiment of the present disclosure. As illustrated in FIG. 14, the optical system 1400 supports a mixed reality device, such as any of the devices described herein above. In an example, the optical system 1400 includes a projector 1410, which can be implemented as discussed in relation to the light projectors discussed herein above. The optical system 1400 includes an optical waveguide combiner system including holographic layers. The optical system 1400 can also include projection optics 1420 operable to direct light produced using projector 1410.

The optical system 1400 additionally includes a processor 1430 (e.g., a microprocessor), a memory 1432, and a com-munications device 1434. The memory 1432, also referred to as storage media or non-transitory computer readable storage media, stores computer-readable instructions of an application, where the computer-readable instructions are executable by the processor 1430 to run the application.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the infor-mation may reside in a storage-area network ("SAN") familiar to those skilled in the art. Similarly, any necessary files for performing the functions attributed to the comput-ers, servers or other network devices may be stored locally and/or remotely, as appropriate. Where a system includes computerized devices, each such device can include hard-ware elements that may be electrically coupled via a bus, the elements including, for example, at least one central pro-cessing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable stor-age media reader, a communications device (e.g., a modem, a network card (wireless or wired), an infrared communi-cation device, etc.) and working memory as described above. The computer-readable storage media reader can be connected with, or configured to receive, a computer-read-able storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application pro-grams, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for contain-ing code, or portions of code, can include any appropriate media known or used in the art, including storage media and communication media, such as but not limited to volatile and non-volatile, removable and non-removable media imple-mented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus comprising:
a light source configured to emit light;
a housing;
an optical waveguide system encapsulated in the housing and configured to receive the light, the optical waveguide system comprising:
    a waveguide substrate having a first surface and a second surface opposite the first surface;
    a first optical de-coupling layer coupled to the first surface of the waveguide substrate and characterized by a first refractive index of less than or equal to 1.25;
    an anti-scratch layer disposed on the first optical de-coupling layer;
    a first holographic optical element comprising a first photopolymer layer and excluding a first polymer substrate; and
    a second a holographic optical element comprising a second photopolymer layer; and
a second optical de-coupling layer characterized by a second refractive index of less than or equal to 1.25,
wherein the first photopolymer layer is in direct contact with the second surface of the waveguide substrate, and wherein the second photopolymer layer is in direct contact with and disposed between the first photopolymer layer and the first optical de-coupling layer.

2. The apparatus of claim 1, wherein the waveguide substrate is a first waveguide substrate, and wherein the optical waveguide system further comprises:

a second waveguide substrate, wherein the first holographic optical element and the second holographic optical element are disposed between the first waveguide substrate and the second waveguide substrate.

3. The apparatus of claim 2, wherein the optical waveguide system further comprises:

a third optical de-coupling layer characterized by a third refractive index of less than or equal to 1.25; and a third holographic optical element comprising a third polymer substrate, wherein:

the third holographic optical element is in direct contact with and disposed between the second waveguide substrate and the third optical de-coupling layer, and the third optical de-coupling layer is in direct contact and disposed between the second holographic optical element and the third holographic optical element.

4. The apparatus of claim 2, wherein the first waveguide substrate is a plastic waveguide substrate, and wherein the second waveguide substrate is a glass waveguide substrate.

5. An optical waveguide system comprising:

a waveguide substrate;

a first holographic optical element comprising a first photopolymer layer and excluding a first polymer substrate;

a second holographic optical element comprising a second photopolymer layer; and an optical de-coupling layer coupled to the waveguide substrate and characterized by a first refractive index of less than or equal to 1.25, wherein the first photopolymer layer is in direct contact with and disposed between the waveguide substrate and the second holographic optical element, and wherein the second photopolymer layer is disposed between the first photopolymer layer and the optical de-coupling layer.

6. The optical waveguide system of claim 5, further comprising:

a third holographic optical element comprising a third photopolymer layer, wherein the second photopolymer layer is in direct contact with and disposed between the first photopolymer layer and the third photopolymer layer.

7. The optical waveguide system of claim 6, wherein the waveguide substrate is a first waveguide substrate, and wherein the optical waveguide system further comprises:

a second waveguide substrate; and a liquid optically clear adhesive (LOCA) layer disposed on the second waveguide substrate, wherein the third photopolymer layer is in direct contact with and disposed between the second photopolymer layer and the LOCA layer.

8. The optical waveguide system of claim 5, wherein the second photopolymer layer is in direct contact with the first photopolymer layer and optical de-coupling layer.

9. The optical waveguide system of claim 8, wherein the waveguide substrate is a first waveguide substrate, and wherein the optical waveguide system further comprises:

a second waveguide substrate; and a third photopolymer layer that is in direct contact with and disposed between the second photopolymer layer and the optical de-coupling layer.

10. The optical waveguide system of claim 5, wherein the waveguide substrate is a first waveguide substrate, and wherein the optical waveguide system further comprises:

a second waveguide substrate, wherein the first holographic optical element and the second holographic optical element are disposed between the first waveguide substrate and the second waveguide substrate, and wherein at least one of the first waveguide substrate or the second waveguide substrate is a plastic waveguide substrate.

11. The optical waveguide system of claim 5, further comprising:

an anti-scratch layer disposed on the optical de-coupling layer.

12. The optical waveguide system of claim 5, wherein the first photopolymer layer is configured to receive and optically couple first light and second light to the waveguide substrate, wherein the first light is characterized by a first wavelength within a first wavelength range, and wherein the second light is characterized by a second wavelength within a non-overlapping second wavelength range.

13. A system comprising:

a light source configured to emit light; and an optical waveguide system configured to receive the light, the optical waveguide system comprising:

a waveguide substrate;

a first holographic optical element comprising a first photopolymer layer and excluding a first polymer substrate;

a second holographic optical element comprising a second photopolymer layer; and an optical de-coupling layer coupled to the waveguide substrate and characterized by a first refractive index of less than or equal to 1.25, wherein the first photopolymer layer is in direct contact with and disposed between the waveguide substrate and the second holographic optical element, and wherein the second photopolymer layer is disposed between the first photopolymer layer and the optical de-coupling layer.

14. The system of claim 13, wherein the optical waveguide system further comprises:

a third holographic optical element that includes a third photopolymer layer and that excludes a third polymer substrate, wherein the second photopolymer layer is disposed between the first photopolymer layer and the third photopolymer layer.

15. The system of claim 14, wherein the waveguide substrate is a first waveguide substrate, and wherein the optical waveguide system further comprises:

a second waveguide substrate, wherein the third photopolymer layer is disposed between the second photopolymer layer and the second waveguide substrate.

16. The system of claim 13, wherein the optical waveguide system further comprises:

a third holographic optical element, wherein the second holographic optical element is disposed between the first holographic optical element and the third holographic optical element, and wherein each one of the first holographic optical element, the second holographic optical element, and the third holographic optical element is configured to operate in a different wavelength range.

17. The system of claim 16, wherein the waveguide substrate is a first waveguide substrate, and wherein the optical waveguide system further comprises:

a second waveguide substrate, wherein the first holographic optical element, the second holographic optical element, and the third holographic optical element are disposed between the first waveguide substrate and the second waveguide substrate.

18. The system of claim 13, wherein the optical waveguide system further comprises:

a third holographic optical element; and an additional optical de-coupling layer that is disposed between the second holographic optical element and the third holographic optical element.

19. The system of claim 18, wherein the waveguide substrate is a first waveguide substrate, wherein the optical waveguide system further comprises:

a second waveguide substrate, wherein the third holographic optical element is in direct contact with and disposed between the additional optical de-coupling layer and the second waveguide substrate.

20. The system of claim 19, wherein the third holographic optical element comprises a third photopolymer layer and excludes a third polymer substrate, and wherein the third photopolymer layer is in direct contact with and disposed between the additional optical de-coupling layer and the second waveguide substrate.

* * * * *